US012640437B2

(12) United States Patent
Mahbub et al.

(10) Patent No.: US 12,640,437 B2
(45) Date of Patent: May 26, 2026

(54) INTERFACIAL MATERIALS IN ARGYRODITE-BASED ALL-SOLID-STATE BATTERIES

(71) Applicant: Rivian IP Holdings, LLC, Irvine, CA (US)

(72) Inventors: Rubayyat Mahbub, Fremont, CA (US); Ezhiylmurugan Rangasamy, Oakland, CA (US); Saravanan Kuppan, San Jose, CA (US); Muratahan Aykol, San Jose, CA (US); Forrest Stephen Gittleson, Mountain View, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 593 days.

(21) Appl. No.: 18/116,656

(22) Filed: Mar. 2, 2023

(65) Prior Publication Data

US 2024/0322366 A1 Sep. 26, 2024

(51) Int. Cl.
H01M 50/431 (2021.01)
H01M 10/0562 (2010.01)

(52) U.S. Cl.
CPC ..... H01M 50/431 (2021.01); H01M 10/0562 (2013.01); H01M 2300/008 (2013.01)

(58) Field of Classification Search
CPC ........... H01M 50/431; H01M 10/0562; H01M 2300/008; H01M 2004/027; H01M 4/366; H01M 4/382; H01M 4/62; H01M 10/052
See application file for complete search history.

(56) References Cited

U.S. PATENT DOCUMENTS

| | | | | |
|---|---|---|---|---|
| 2012/0161321 A1* | 6/2012 | Haverty | ................. | H10D 62/83 |
| | | | | 438/653 |
| 2019/0225883 A1* | 7/2019 | Min | ...................... | C09K 11/885 |
| 2021/0305578 A1* | 9/2021 | Kumar | .................... | H01M 4/62 |
| 2022/0255078 A1* | 8/2022 | Komatsu | ............... | H01M 4/134 |
| 2022/0344669 A1* | 10/2022 | Schmidt | ............ | H01M 10/0525 |
| 2022/0359875 A1* | 11/2022 | Chen | ................... | H01M 4/0402 |
| 2024/0322184 A1* | 9/2024 | Mahbub | .................. | H01M 4/62 |

OTHER PUBLICATIONS

Xiao, Y. et al. (May 15, 2019). "Computational Screening of Cathode Coatings for Solid-State Batteries," ScienceDirect, vol. 3, Issue 5, located at: https://www.sciencedirect.com/science/article/pii/S2542435119300868, 57 pages.

* cited by examiner

*Primary Examiner* — Stewart A Fraser
(74) *Attorney, Agent, or Firm* — BAKERHOSTETLER

(57) ABSTRACT

Particular embodiments may provide interfacial materials for a solid-state electrolyte interface. In some embodiments, the solid-state electrolyte is argyrodite-based. In some embodiments, the interfacial material may comprise a binary halide, a ternary halide, a binary sulfide, a ternary sulfide, or a combination thereof. In some embodiments, the interfacial material may be disposed at the interface of the anode and the solid-state electrolyte and/or the interface of the cathode and the solid-state electrolyte.

18 Claims, 12 Drawing Sheets

Figure 1:
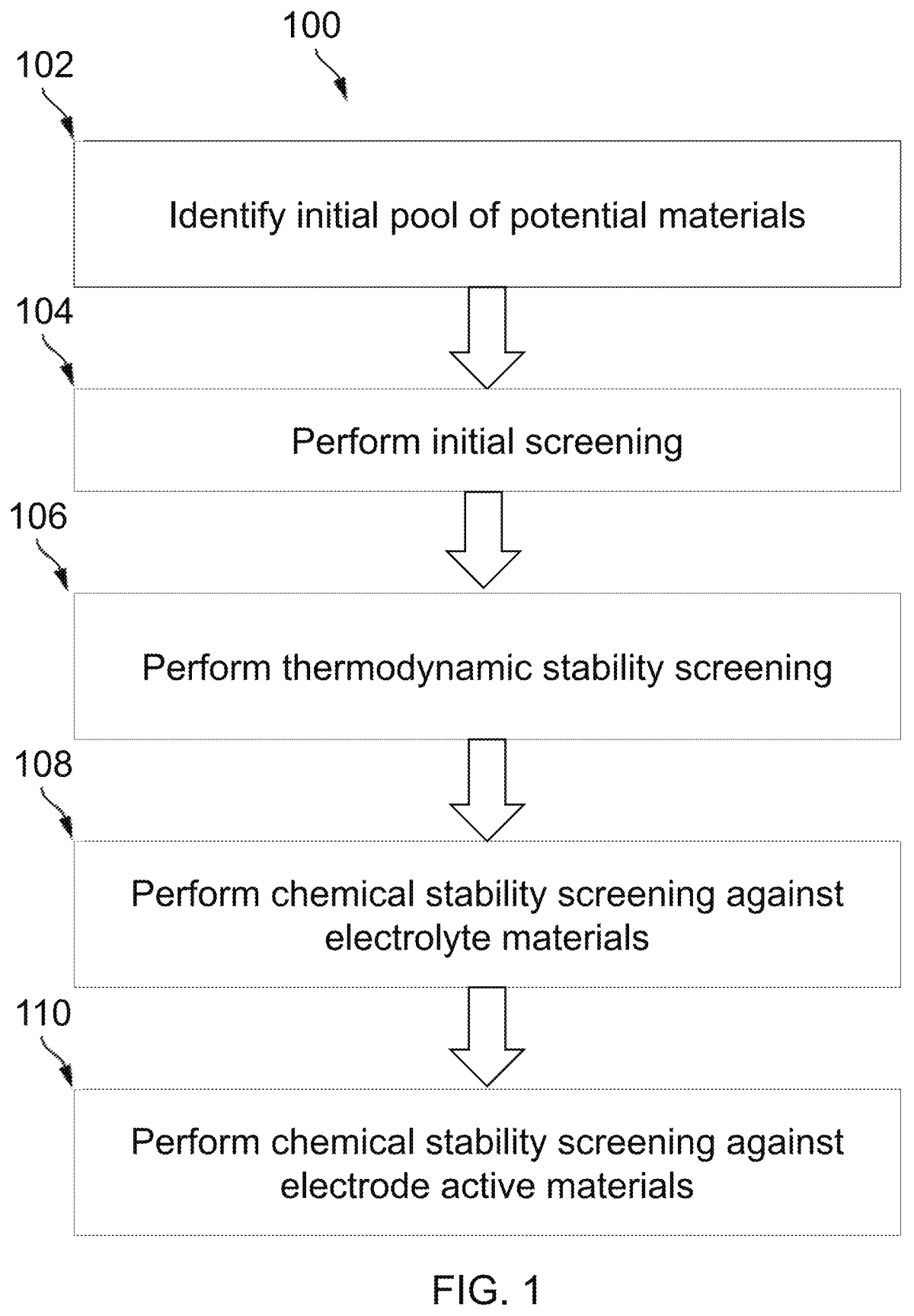

100

102

Identify initial pool of potential materials

104

Perform initial screening

106

Perform thermodynamic stability screening

108

Perform chemical stability screening against electrolyte materials

110

Perform chemical stability screening against electrode active materials

INTERFACIAL MATERIALS IN ARGYRODITE-BASED ALL-SOLID-STATE BATTERIES

INTRODUCTION

This disclosure is generally related to interfacial materials, such as binary and ternary metal halides and sulfides, between electrodes and argyrodite-based solid-state electrolytes.

BRIEF SUMMARY

In one aspect, provided herein are interfacial materials for solid state batteries having argyrodite-based solid-state electrolytes, which may be useful in stabilizing the interfaces between the electrolyte and other components (e.g., the cathode and/or anode) of the battery. The interfacial material may comprise a binary halide, a ternary halide, a binary sulfide, and/or a ternary sulfide. The interfacial material may be located at the interface between the cathode material of the battery and the solid-state electrolyte and/or at the interface between the anode material of the battery and the solid-state electrolyte, and may be disposed as a separate continuous layer at one or both of such interfaces or as a coating on the material of a cathode and/or anode. The interfacial material is ionically conductive while being electronically insulating, and may protect the underlying electrode material from degrading reactions with the solid-state electrolyte materials.

In a first aspect, provided herein is an interfacial material for a solid state electrolyte interface, wherein the interfacial material comprises a binary halide, a ternary halide, a binary sulfide, a ternary sulfide, or a combination thereof.

In some embodiments, the interfacial material comprises a rock-salt structure. In some embodiments, the interfacial material comprises a binary sulfide of formula AAS, wherein AA is a group 2 metal and S is Sulphur. In some embodiments, the interfacial material comprises CaS, or SrS. In some embodiments, the interfacial material comprises a binary halide of formula $A_nX_m$ wherein: n is substantially equal to m; A is a group 1A alkali metal; and X is a group 7A halogen. In some embodiments, the interfacial material is LiBr, LiF, NaI, NaBr, KI, LiCl, KBr, KCl, or NaCl.

In some embodiments, the interfacial material comprises a ternary halide of formula $A_wB_xX_y$, or $A_aX_bY_c$, wherein: y is substantially equal to w+x; a is substantially equal to b+c; A is a group 1A alkali metal or a group 2 metal; B is a group 1A alkali metal; and X and Y are group 7A halogens. In other such embodiments, the interfacial material comprises $K_5BrCl_4$, $K_5Br_4Cl$, $K_3I_2Br$, $K_3BrCl_2$, $K_2BrCl$, $Li_2IBr$, $Na_5Br_4Cl$, $K_4NaCl_5$, $K_2NaCl_3$, $Na_2BrCl$, $Na_3BrCl_2$, $KNaCl_2$, $Na_5BrCl_4$, $KNa_4Cl_5$, $BaIBr$, or a combination thereof. In some embodiments, the ternary halide comprises a caswellsilverite-like structure.

In some embodiments, the interfacial material comprises a ternary sulfide of formula $AA_2BBS_4$ or $AABBS_3$, wherein: S is Sulfur; AA is a group 2 metal; and BB is a group 4 transition metal. In other such embodiments, the interfacial material comprises $SrHfS_3$ or $SrZrS_3$.

In some embodiments, the energy above the convex hull ($E_{hull}$) of the interfacial material is less than about 20 meV/atom.

In another aspect, provided herein is a battery comprising: an anode; a cathode; a solid-state electrolyte layer; and interfacial material of any of the preceding embodiments disposed at the interface of the anode and the solid state electrolyte layer. In some embodiments, the anode comprises a metallic sheet and the interfacial coating is disposed on the metallic sheet of the battery. In some embodiments, the anode comprises a particulate material and the interfacial coating is disposed on the particulate material of the anode. In some embodiments, the interfacial material comprises a standalone layer disposed between the anode and the solid-state electrolyte layer. In some embodiments, the interfacial coating comprises a layer that is disposed on the anode of the battery, a conductive additive material of the battery, a binder material of the battery, the solid-state electrolyte layer, or any combination thereof. In some embodiments, the anode comprises graphitic carbon, lithium, a lithium alloy, lithium titanate, silicon, a silicon-based carbon composite, or any combination thereof. In some embodiments, the solid-state electrolyte is argyrodite-based. In some embodiments, the solid-state electrolyte comprises LPSC, $Li_6PS_5Cl$, a doped composition of LPSC, a doped composition of $Li_6PS_5Cl$, an off-stoichiometric composition of LPSC, an off-stoichiometric composition of $Li_6PS_5Cl$, or any combination thereof.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 1 illustrates an exemplary method to identify interfacial materials for argyrodite-based solid-state batteries, in accordance with some embodiments disclosed herein;

In the Figures, like reference numerals refer to like components unless otherwise stated herein.

DETAILED DESCRIPTION

Figure 2A:
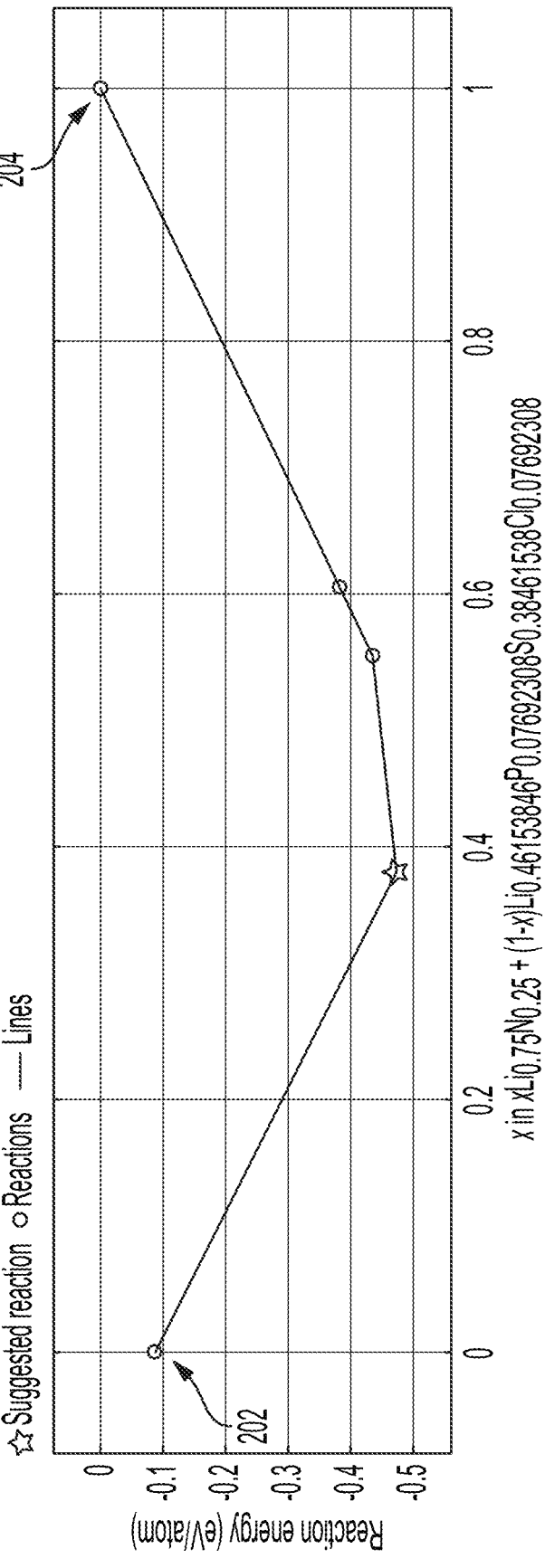
FIG. 2A depicts the chemical reaction between $Li_6PS_5Cl$ and $Li_3N$.

Traditional lithium-ion batteries include active materials forming electrodes (e.g., a cathode and anode) separated by a non-aqueous liquid electrolyte solution. In contrast, solid-state batteries utilize a solid-state electrolyte (SSE) between electrodes. Relative to traditional batteries, solid-state batteries have improved safety, power density, and energy density. Current solid-state batteries, however, may exhibit instability at the interface between the solid-state electrolyte and the electrodes of the battery that leads to deterioration of battery cell performance. For instance, interfacial reactivity between the cathode material and the SSE of a solid-state battery can increase the electrical resistance at that interface which hampers lithium transport within the battery cell. Similarly, lithium metal anodes in solid-state batteries, which can greatly increase the energy density of the battery relative to other materials, are highly reactive with many SSE materials, which can trigger progressive electrochemical reduction of the SSE that degrades cell performance over time.

Provided herein are interfacial materials that improve the stability between the electrolyte material and one or both of the electrodes of solid-state batteries. The interfacial materials discussed herein are ionically conductive while exhibiting phase and chemical stability with argyrodite-type solid-state electrolytes, which can reduce the interfacial reactivity at the interfaces between the solid-state electrolyte and one or both of the electrodes of the solid-state battery. A solid-state battery incorporating one or more interfacial materials as described herein may exhibit improved stability and thus improved battery cell performance for longer periods relative to a solid-state battery without the interfacial materials.

FIG. 1 illustrates an exemplary method 100 to identify interfacial materials for solid-state batteries. Method 100 can involve identifying one or more interfacial materials that are suitable for use as an interfacial coating material between an electrode and an electrolyte of a battery to improve the stability and cell performance of the battery. For example, method 100 can be implemented to identify an interfacial material to be disposed at the interface between the anode and the electrolyte layer and/or the cathode and the electrolyte layer of a battery.

In one or more examples, method 100 begins at step 102 wherein an initial pool of potential materials is identified. The initial pool of materials can include materials from a database of materials with their associated properties calculated according to first-principles density functional theory (DFT). For instance, the initial pool of materials may be selected from a commercial or open access database such as materialproject.org. The initial pool of materials can include all binary, ternary, and quaternary compounds. In one or more examples, the initial pool of all binary, ternary, and quaternary compounds can include more than 87,000 potential compounds. The initial pool of materials can include potential compounds that are suitable for use in argyrodite-based solid-state batteries, and those that are relatively simple and easy to synthesize on a large scale.

After identifying the initial pool of potential materials at step 102, the method 100 can move to step 104 wherein an initial screening of the potential materials is performed. The initial screening of step 104 can include removing radioactive, toxic, expensive, and/or rare elements. Optionally, Pt, Au, Pm, Po, At, Rn, Fr, Ra, Ac, Th, Rd, Pa, U, Np, Pu, Am, Cm, Pb, As, Cd, and/or Bk may be removed at step 104. In one or more examples, the screened pool of materials after performing the screening of step 104 can include approximately 38,000 candidate materials.

After performing the initial screening at step 104, the method 100 can move to step 106 wherein thermodynamic stability screening is performed. To assess thermodynamic stability, the energy above the convex hull ($E_{hull}$) of each candidate compound can be considered. When the energy above the convex hull ($E_{hull}$) is close to 0, the compound is thermodynamically stable. When the energy above the convex hull ($E_{hull}$) is above 0, the compound is metastable (i.e., decomposes to more thermodynamically stable phase mixtures). When the energy above the convex hull ($E_{hull}$) is greater than 0 but less than about 25 meV/atom, the compound is thermodynamically nearly stable. When the compound is nearly stable, it is highly likely that the compound can be successfully stabilized at room temperature, where the thermal energy $k_B T$, at room temperature is 25.7 meV. Here, kB is the Boltzmann constant ($8.617333262 \times 10^{-5}$ eV/K) and T is the temperature (here, room temperature, 298.15 K). The value of $k_B T$ can refer to the probability of finding a system in a state of energy E, given that it is in a surrounding environment at temperature T. In other words, if the value of the energy above the convex hull ($E_{hull}$) is less than about 25 meV/atom, there is a likelihood to find the corresponding compound at room temperature (i.e., 25° C.). In one or more examples, when performing thermodynamic stability screening at step 106, candidate compounds with an energy above the convex hull ($E_{hull}$) greater than about 20 meV/atom are screened out. In one or more examples, the screened pool of materials after performing the screening of step 106 can include approximately 12,000 candidate materials.

After performing the thermodynamic stability screening at step 106, the method 100 can move to step 108 wherein chemical stability screening against one or more electrolyte materials is performed. The chemical stability screening performed at step 108 can include screening the candidate materials based on their chemical stability with a solid-state electrolyte. In one or more examples, the electrolyte material can be a solid-state material that is argyrodite-based. Accordingly, screening for chemical stability at step 108 can include screening out the candidate compounds that are not chemically stable with an argyrodite-type solid-state electrolyte. For example, screening at step 108 can include screening candidate materials based on their chemical stability with a lithium phosphorus sulfide chloride (LPSC) electrolyte, such as $Li_6PS_5Cl$. In one or more examples, after performing the screening of step 108, the screened pool of materials that exhibit chemical stability can include approximately 275 candidate compounds.

Determining chemical stability with LPSC or another solid-state electrolyte can be based on the convex hull of the candidate compound. For example, the convex hull can be calculated for the set of elements defined by the candidate compound plus the electrolyte material, and the presence or absence of a tie line connecting the candidate compound with the electrolyte can indicate chemical stability or instability.

The convex hull of an unstable reaction is shown in the plot of FIG. 2A, which shows the chemical reaction between $Li_6PS_5Cl$ and $Li_3N$, a potential candidate compound. As shown in FIG. 2A, there is no straight tie line between the molar fraction x=0 to x=1. In other words, there is no straight tie line connecting point 202 with point 204. Instead, the convex hull shows that the most favorable reaction energy between $Li_6PS_5Cl$ and $Li_3N$ is −0.474 eV/atom. If $Li_3N$ were to be deposited as an interfacial coating in a solid-state battery that includes an $Li_6PS_5Cl$ electrolyte, the $Li_3N$ would react with the $Li_6PS_5Cl$. Thus, $Li_3N$ does not exhibit chemical stability with the $Li_6PS_5Cl$ electrolyte.

Figure 2B:
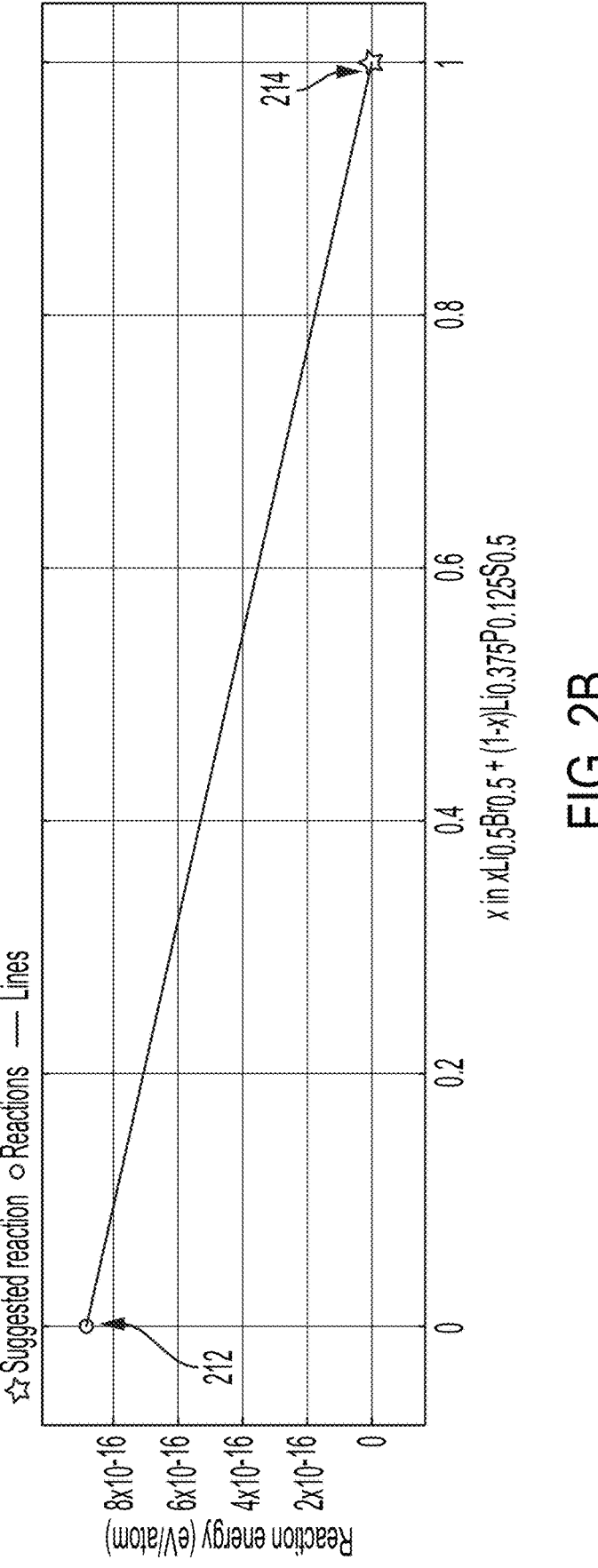
FIG. 2B depicts the chemical reaction between LiBr and $Li_3PS_4$, in accordance with some embodiments disclosed herein.

In contrast, the convex hull of a stable reaction is shown in the plot of FIG. 2B, which shows the chemical reaction between LiBr and $Li_3PS_4$. As shown, there is a straight tie line between the molar fraction x=0 to x=1 connecting point 212 with point 214. This illustrates that LiBr and $Li_3PS_4$ are chemically stable with one another. Thus, an interfacial material comprising LiBr would not react with $Li_3PS_4$.

Returning now to FIG. 1, after performing chemical stability screening against one or more electrolyte materials, the method 100 can move to step 110 wherein chemical stability screening against one or more electrode active materials is performed. Screening for chemical stability against electrode active materials can be performed at step 110 of method 100 to identify candidate compounds that are suitable for use as an interfacial material that improves the stability between the electrolyte material and one or both of the electrodes (i.e., one or both of the cathode and anode) of a battery cell.

In one or more examples, the chemical stability screening performed at step 110 can include screening against cathode active materials. The cathode active materials can be materials for inclusion in a battery cell, such as a solid-state battery having a solid-state electrolyte. Determining chemical stability with one or more cathode active materials can be based on the convex hull of the candidate compound, as described above.

In one or more examples, the chemical stability screening performed at step 110 can be between the candidate compound and nickel-based cathode materials, and/or lithium metal phosphate cathode materials to identify candidate compounds that exhibit improved stability when used as a coating material at the interface between a nickel-based cathode material or a lithium metal phosphate cathode material and the electrolyte material of a battery cell. For example, the screening of step 110 can be performed against both NMC622 ($LiNi_{0.6}Mn_{0.2}Co_{0.2}O_2$) and LFP (Lithium Iron Phosphate), which are two commonly used lithium-ion chemistries for lithium-ion batteries, with the pool of candidate materials including 19 materials that are chemically stable against both NMC622 and LFP. These 19 candidate compounds are shown in Table 1, below.

TABLE 1

| Candidate Compounds Chemically Stable with NMC and LFP Cathode Materials | | |
| --- | --- | --- |
| Compound | Reaction with NMC 622 | Reaction with LFP |
| LiBr | $LiBr + Li_1Mn_{0.2}Co_{0.2}Ni_{0.6}O_2 \rightarrow$ No Reaction | $LiBr + LiFePO_4 \rightarrow$ No Reaction |
| LiF | $LiF + Li_1Mn_{0.2}Co_{0.2}Ni_{0.6}O_2 \rightarrow$ No Reaction | $LiF + LiFePO_4 \rightarrow$ No Reaction |
| NaBr | $NaBr + Li_1Mn_{0.2}Co_{0.2}Ni_{0.6}O_2 \rightarrow$ No Reaction | $NaBr + LiFePO_4 \rightarrow$ No Reaction |
| LiCl | $LiCl + Li_1Mn_{0.2}Co_{0.2}Ni_{0.6}O_2 \rightarrow$ No Reaction | $LiCl + LiFePO_4 \rightarrow$ No Reaction |
| KBr | $KBr + Li_1Mn_{0.2}Co_{0.2}Ni_{0.6}O_2 \rightarrow$ No Reaction | $KBr + LiFePO_4 \rightarrow$ No Reaction |
| NaCl | $NaCl + Li_1Mn_{0.2}Co_{0.2}Ni_{0.6}O_2 \rightarrow$ No Reaction | $NaCl + LiFePO_4 \rightarrow$ No Reaction |
| KCl | $KCl + Li_1Mn_{0.2}Co_{0.2}Ni_{0.6}O_2 \rightarrow$ No Reaction | $KCl + LiFePO_4 \rightarrow$ No Reaction |
| $KNaCl_2$ | $KNaCl_2 + Li_1Mn_{0.2}Co_{0.2}Ni_{0.6}O_2 \rightarrow$ No Reaction | $KNaCl_2 + LiFePO_4 \rightarrow$ No Reaction |
| $KNa_4Cl_5$ | $KNa_4Cl_5 + LiMn_{0.2}Co_{0.2}Ni_{0.6}O_2 \rightarrow$ No Reaction | $KNa_4Cl_5 + LiFePO_4 \rightarrow$ No Reaction |
| $K_2NaCl_3$ | $K_2NaCl_3 + Li_1Mn_{0.2}Co_{0.2}Ni_{0.6}O_2 \rightarrow$ No Reaction | $K_2NaCl_3 + LiFePO_4 \rightarrow$ No Reaction |
| $K_4NaCl_5$ | $K_4NaCl_5 + Li_1Mn_{0.2}Co_{0.2}Ni_{0.6}O_2 \rightarrow$ No Reaction | $K_4NaCl_5 + LiFePO_4 \rightarrow$ No Reaction |
| $Na_2BrCl$ | $Na_2BrCl + Li_1Mn_{0.2}Co_{0.2}Ni_{0.6}O_2 \rightarrow$ No Reaction | $Na_2BrCl + LiFePO_4 \rightarrow$ No Reaction |
| $Na_5Br_4Cl$ | $Na_5Br_4Cl + Li_1Mn_{0.2}Co_{0.2}Ni_{0.6}O_2 \rightarrow$ No Reaction | $Na_5Br_4Cl + LiFePO_4 \rightarrow$ No Reaction |
| $Na_5BrCl_4$ | $Na_5BrCl_4 + Li_1Mn_{0.2}Co_{0.2}Ni_{0.6}O_2 \rightarrow$ No Reaction | $Na_5BrCl_4 + LiFePO_4 \rightarrow$ No Reaction |
| $K_5Br_4Cl$ | $K_5Br_4Cl + Li_1Mn_{0.2}Co_{0.2}Ni_{0.6}O_2 \rightarrow$ No Reaction | $K_5Br_4Cl + LiFePO_4 \rightarrow$ No Reaction |

TABLE 1-continued

| Candidate Compounds Chemically Stable with NMC and LFP Cathode Materials | | |
|---|---|---|
| Compound | Reaction with NMC 622 | Reaction with LFP |
| $K_5BrCl_4$ | $K_5BrCl_4 + Li_1Mn_{0.2}Co_{0.2}Ni_{0.6}O_2 \rightarrow$ No Reaction | $K_5BrCl_4 + LiFePO_4 \rightarrow$ No Reaction |
| $K_3BrCl_2$ | $K_3BrCl_2 + Li_1Mn_{0.2}Co_{0.2}Ni_{0.6}O_2 \rightarrow$ No Reaction | $K_3BrCl_2 + LiFePO_4 \rightarrow$ No Reaction |
| $Na_3BrCl_2$ | $Na_3BrCl_2 + Li_1Mn_{0.2}Co_{0.2}Ni_{0.6}O_2 \rightarrow$ No Reaction | $Na_3BrCl_2 + LiFePO_4 \rightarrow$ No Reaction |
| $K_2BrCl$ | $K_2BrCl + Li_1Mn_{0.2}Co_{0.2}Ni_{0.6}O_2 \rightarrow$ No Reaction | $K_2BrCl + LiFePO_4 \rightarrow$ No Reaction |
| $HfO_2$ | $HfO_2 + Li_1Mn_{0.2}Co_{0.2}Ni_{0.6}O_2 \rightarrow$ No Reaction | $HfO_2 + LiFePO_4 \rightarrow$ No Reaction |
| $Li_3PO_4$ | $LiBr + Li_1Mn_{0.2}Co_{0.2}Ni_{0.6}O_2 \rightarrow$ No Reaction | $Li_3PO_4 + LiFePO_4 \rightarrow$ No Reaction |
| $MgCr_2O_4$ | $MgCr_2O_4 + Li_1Mn_{0.2}Co_{0.2}Ni_{0.6}O_2 \rightarrow$ No Reaction | $0.8889\ LiFePO_4 + 0.1111\ MgCr_2O_4 \rightarrow 0.1667\ Fe(PO_3)_2 + 0.1111\ MgP_4O_{11} + 0.05556\ FeP_6 + 0.2222\ Li_4CrFe_3O_8$ |

The 19 candidate materials of Table 1 can be grouped into one of two material families: (1) binary halides and (2) ternary halides.

The binary halides can include materials comprising a compound of formula $A_nX_m$ wherein n is substantially equal to m, A is a group 1A alkali metal, and X is a group 7A halogen. In one or more examples, A is selected from the group 1A alkali metals consisting of Li, Na, K, Rb, Cs, and Fr. In one or more examples, X and Y are selected from the group 7A halogens consisting of F, Cl, Br, I and At. The binary halides can comprise a rock-salt structure. In one or more examples, the binary halides that are chemically stable with both NMC622 and LFP include LiBr, LiF, NaBr, LiCl, KBr, KCl, NaCl, or a combination thereof.

The ternary halides can include materials comprising a compound of formula AwBxXy or AaXbYc, wherein y is substantially equal to w+x, a is substantially equal to b+c, A and B are group 1A alkali metals, and X and Y are group 7A halogens. In one or more examples, A and B selected from the group 1A alkali metals consisting of Li, Na, K, Rb, Cs, and Fr. In one or more examples, X and Y are selected from the group 7A halogens consisting of F, Cl, Br, I and At. In one or more examples, the ternary halides comprising the compound of formula AwBxXy include KNaCl2, KNa4Cl5, K2NaCl3, K4NaCl5, or a combination thereof. In one or more examples, the ternary halides comprising the compound of formula AaXbYc include Na2BrCl, Na5Br4Cl, Na5BrCl4, K5Br4Cl, K5BrCl4, K3BrCl2, Na3BrCl2, K2BrCl, or a combination thereof. The ternary halides can comprise a caswellsilverite-like structure, such as an NaHF2-type hexagonal rhombohedral structure (R3m).

In one or more examples, the pool of candidate materials screened according to step 110 can include additional materials that are not grouped into one of the two material families above, but are chemically stable with one or both of NMC and LFP. For example, HfO2 and Li3PO4 are both chemically stable with both NMC and LFP but do not accord with any of the above formulas. These compounds are nonetheless interfacial materials that can be incorporated into a battery cell and improve the stability between the electrolyte material and the cathode material. Similarly, $MgCr_2O_4$ does not accord the above formulas, is chemically stable with NMC, but reacts with LFP; $MgCr_2O_4$ would thus be suitable as an interfacial material in a battery cell having cathode active materials comprising NMC but not having cathode active materials comprising LFP.

In addition to or alternatively to screening against cathode active materials, in one or more examples, the chemical stability screening performed at step 110 can include screening against anode active materials. The anode active materials can be materials for inclusion in a battery cell, such as a solid-state battery having a solid-state electrolyte. Determining chemical stability with one or more anode active materials can be based on the convex hull of the candidate compound, as described above.

In one or more examples, the chemical stability screening performed at step 110 can be between the candidate compound and a Li metal anode, which may be compared to the chemical stability between a conventional coating material such as $Al_2O_3$ and a Li metal anode to identify candidate compounds that exhibit improved stability when used as a coating material at the interface between a Li metal anode and the electrolyte material of a battery cell. For example, 0.151 $Al_2O_3$ reacts with 0.849 Li (ratio of $Al_2O_3$ to Li of 5.623) to form 0.113 $Li_5AlO_2$ and 0.094 $Li_3Al_2$ with a reaction enthalpy $E_{rxn}$ of −0.22 eV/atom. That is, the most stable reaction between $Al_2O_3$ and Li metal has a reaction enthalpy $E_{rxn}$ of −0.22 eV/atom. The chemical reaction between Li metal and $Al_2O_3$ is shown in Table 2, below.

TABLE 2

| Chemical Reaction Between Li metal and $Al_2O_3$ | | |
|---|---|---|
| Reaction | Ratio: $\frac{Li}{Al_2O_3}$ | $E_{rxn}$ (ev/atom) |
| 0.849 Li + 0.151 $Al_2O_3 \rightarrow$ 0.094 $Li_3Al_2$ + 0.113 $Li_5AlO_4$ | 5.623 | −0.22 |

Coating materials that exhibit improved stability relative to $Al_2O_3$ will either not react with Li metal (no reaction at all), or will react with Li metal but have a chemical reaction with a greater reaction enthalpy $E_{rxn}$ than the reaction enthalpy of the chemical reaction between Li metal and $Al_2O_3$ (e.g., a greater $E_{rxn}$ than-0.22 eV/atom) and an improved Li stability score. In one or more examples, the pool of candidate compounds remaining after performing step 110 can include 34 candidate materials that exhibit improved stability relative to $Al_2O_3$.

Of the 34 candidate materials that exhibit improved stability relative to $Al_2O_3$, 21 do not react with Li metal (e.g., have a reaction enthalpy of 0 eV/atom). These 21 candidate compounds are shown in Table 3, below.

Table 4 lists, for each candidate compound: (1) the ratio of Li metal versus the candidate compound ("Ratio 1"), (2) the ratio of Li metal to the candidate compound (Ratio 1) versus the ratio of Li metal to $Al_2O_3$ (5.623 as above) ("Ratio 2"), (3) the reaction enthalpy Ern of the chemical reaction between Li metal and the compound ("$E_{rxn}$ 1"), and (4) the ratio of the reaction enthalpy of the chemical reaction between Li metal and the compound ($E_{rxn}$ 1) and the reaction enthalpy of Li metal and $Al_2O_3$ (−0.22 eV/atom as above) ("$E_{rxn}$ 2"). Finally, Table 4 also includes a Li Stability Score, which is a stability score calculated relative to the stability of Li metal and $Al_2O_3$. The stability of Li metal and $Al_2O_3$ can be calculated based on the ratio of Li metal to $Al_2O_3$ (Ratio 2), the reaction enthalpy of Li metal and $Al_2O_3$($E_{rxn}$ 2), and the molar weight of $Al_2O_3$ according to the below equation:

$$\text{Stability of Material} = \frac{(\text{Ratio } 2 + E_{rxn} \, 2)}{\text{molecular weight of material}} * (1{,}000)$$

For $Al_2O_3$, which has a molecular weight of 101.961 g/mol, the stability is calculated to be 19.615 according to the above equation. The stability of the candidate compounds can be calculated according to the same equation, and can then be compared to the stability of $Al_2O_3$ using the below equation:

$$\text{Li Stability Score} = \frac{\text{Stability of } Al_2O_3}{\text{Stability of Candidate Compound}} * (100)$$

As shown in Table 4, each candidate compound has a Li stability score that is at least double the Li stability score of $Al_2O_3$. Accordingly, each candidate compound of Table 4 would have improved stability relative to $Al_2O_3$ if incorporated as a coating material with Li metal.

TABLE 3

Candidate Compounds Chemically Stable
with Li Metal Anode Compared to $Al_2O_3$

| Compound | Reaction with Li Metal | $E_{rxn}$ (ev/atom) |
|---|---|---|
| CaS | Li + Cas → NO reaction | 0 |
| LiBr | Li + LiBr → NO reaction | 0 |
| LiF | Li + LiF → NO reaction | 0 |
| NaI | Li + NaI → NO reaction | 0 |
| NaBr | Li + NaBr → NO reaction | 0 |
| KI | Li + KI → NO reaction | 0 |
| SrS | Li + SrS → NO reaction | 0 |
| LiCl | Li + LiCl → NO reaction | 0 |
| KBr | Li + KBr → NO reaction | 0 |
| $Li_2S$ | Li + $Li_2S$ → NO reaction | 0 |
| KCl | Li + KCl → NO reaction | 0 |
| $BaI_2$ | Li + $BaI_2$ → NO reaction | 0 |
| $KBa_2I_5$ | Li + $KBa_2I_5$ → NO reaction | 0 |
| BaIBr | Li + BaIBr → NO reaction | 0 |
| $K_5BrCl_4$ | Li + K5BrCl4 → NO reaction | 0 |
| $K_5Br_4Cl$ | Li + $K_5Br_4Cl$ → NO reaction | 0 |
| $K_3I_2Br$ | Li + $K_3I_2Br$ → NO reaction | 0 |
| $K_3BrCl_2$ | Li + $K_3BrCl_2$ → NO reaction | 0 |
| $K_2BrCl$ | Li + $K_2BrCl$ → NO reaction | 0 |
| $Sr_3CaS_4$ | Li + $Sr_3CaS_4$ → NO reaction | 0 |
| $Li_2IBr$ | Li + $Li_2IBr$ → NO reaction | 0 |

The above 21 candidate compounds would have improved stability if incorporated as a coating material with Li metal because the Li metal and the candidate compound would not react chemically.

Of the 34 candidate materials that exhibit improved stability relative to $Al_2O_3$, 13 do react with Li metal, but exhibit improved stability versus $Al_2O_3$. These 13 candidate compounds are shown in Table 4, below.

TABLE 4

Candidate Compounds More Chemically Stable with Li Metal Anode Compared to $Al_2O_3$

| Compound | Reaction with Li Metal | Ratio 1: $\frac{\text{Li}}{\text{Compound}}$ | Ratio 2: vs $Al_2O_3$ | $E_{rxn}$ 1 eV/atom | $E_{rxn}$ 2: vs $Al_2O_3$ | Li Stability Score |
|---|---|---|---|---|---|---|
| $Al_2O_3$ | 0.849 Li + 0.151$Al_2O_3$ → 0.094 $Li_3Al_2$ + 0.113 $Li_5AlO_4$ | 5.623 | 1 | −0.22 | 1 | 100 |
| $Na_5Br_4Cl$ | 0.5 Li + 0.5 $Na_5Br_4Cl$ → 2 NaBr + 0.5 LiCl + 0.5 Na | 1 | 0.1778 | −0.01 | 0.0454 | 4128.829 |
| $K_4NaCl_5$ | 0.5 $K_4NaCl_5$ + 0.5 Li → 2 KCl + 0.5 Na + 0.5 LiCl | 1 | 0.1778 | −0.015 | 0.0681 | 2843.533 |
| $K_2NaCl_3$ | 0.5 $K_2NaCl_3$ + 0.5 Li → KCl + 0.5 Na + 0.5 LiCl | 1 | 0.1778 | −0.021 | 0.0954 | 1489.616 |
| $Na_2BrCl$ | 0.5 Li + 0.5 Na2BrCl → 0.5 NaBr + 0.5 LiCl + 0.5 Na | 1 | 0.1778 | −0.013 | 0.0590 | 1335.679 |
| $Na_3BrCl_2$ | 0.667 Li + 0.333 $Na_3BrCl_2$ → 0.333 NaBr + 0.667 LiCl + 0.667 Na | 2.003 | 0.3562 | −0.014 | 0.0636 | 1026.795 |
| $KNaCl_2$ | 0.5 $KNaCl_2$ + 0.5 Li → 0.5 KCl + 0.5 Na + 0.5 LiCl | 1 | 0.1778 | −0.024 | 0.1090 | 909.1748 |
| $Na_5BrCl_4$ | 0.8 Li + 0.2 $Na_5BrCl_4$ → 0.2 NaBr + 0.8 LiCl + 0.8 Na | 4 | 0.7113 | −0.016 | 0.0727 | 842.2182 |
| $KNa_4Cl_5$ | 0.2 $KNa_4Cl_5$ + 0.8 Li → 0.2 KCl + 0.8 Na + 0.8 LiCl | 4 | 0.7113 | −0.022 | 0.1 | 745.3894 |
| NaCl | 0.5 Li + 0.5 NaCl → 0.5 LiCl + 0.5 Na | 1 | 0.1778 | −0.015 | 0.0681 | 465.9607 |
| $Ba_2SiS_4$ | 0.8 Li + 0.2 $Ba_2SiS_4$ → 0.4 BaS + 0.4 $Li_2S$ + 0.2 Si | 4 | 0.7113 | −0.46 | 2.0909 | 301.6894 |
| $SrHfS_3$ | 0.8 Li + 0.2 $SrHfS_3$ → 0.4 $Li_2S$ + 0.2 SrS + 0.2 Hf | 4 | 0.7113 | −0.362 | 1.6454 | 301.5380 |
| $SrZrS_3$ | 0.22 $SrZrS_3$ + 0.78 Li → 0.024 $Zr_9S_2$ + 0.39 $Li_2S$ + 0.22 SrS | 3.545 | 0.6304 | −0.383 | 1.7409 | 227.5052 |
| $Sr_2SiS_4$ | 0.8 Li + 0.2 $Sr_2SiS_4$ → 0.4 $Li_2S$ + 0.4 SrS + 0.2 Si | 4 | 0.7113 | −0.508 | 2.3090 | 215.3360 |

Also shown in Table 4, each candidate compound has a lower ratio of Li metal to the candidate compound (Ratio 1) than the ratio of Li metal to $Al_2O_3$ (5.623). The ratio of the Li metal to each compound from the chemical reaction corresponds to how much lithium metal is consumed in the reaction. Thus, a lower Ratio 1 value indicates that less lithium is consumed in the chemical reaction. Accordingly, each candidate compound of Table 4 consumes less lithium than $Al_2O_3$. The same is true for the candidate compounds of Table 3, which each have a ratio of Li metal to candidate compound of 1, which is less than the ratio of Li metal to $Al_2O_3$. Moreover, most of the candidate compounds of Table 4 exhibit a reaction enthalpy $E_{rxn}$ that is greater than the reaction enthalpy $E_{rxn}$ of the chemical reaction of $Al_2O_3$ with Li metal (−0.22 eV/atom), meaning most of the candidate compounds of Table 4 are less likely to react with Li metal than $Al_2O_3$. While some of the candidate compounds of Table 4 exhibit a reaction enthalpy Fran that is less than the reaction enthalpy $E_{rxn}$ of the chemical reaction of $Al_2O_3$ with Li metal (−0.22 eV/atom), such as $Ba_2SiS_4$, which has a reaction enthalpy of −0.46 eV/atom, these candidate compounds are nonetheless more stable than $Al_2O_3$ based on their Ratio 1 values, which indicate the reaction of these compounds with Li metal will consume less lithium metal than the reaction between $Al_2O_3$ and Li metal.

The 34 candidate materials of Table 3 and Table 4 can be grouped into one of four material families: (1) binary halides, (2) ternary halides, (3) binary sulfides, (4) ternary sulfides.

The binary sulfides can include materials comprising a compound of formula AAS, wherein AA is a group 2 metal and S is Sulphur. In one or more examples, AA is selected from the group 2 metals consisting of Be, Mg, Ca, Sr, Ba, and Ra. The binary halides can comprise a rock-salt structure. In one or more examples, the binary halides that are chemically stable with Li metal include CaS, SrS, or a combination thereof.

The binary halides can include materials comprising a compound of formula a compound of formula $A_nX_m$ wherein n is substantially equal to m, A is a group 1A alkali metal, and X is a group 7A halogen. In one or more examples, A is selected from the group 1A alkali metals consisting of Li, Na, K, Rb, Cs, and Fr. In one or more examples, X and Y are selected from the group 7A halogens consisting of F, Cl, Br, I and At. The binary halides can comprise a rock-salt structure. In one or more examples, the binary halides that are chemically stable with Li metal can include LiBr, LiF, NaI, NaBr, KI, LiCl, KBr, KCl, NaCl, or a combination thereof.

The ternary halides can include materials comprising a compound of formula $A_wB_xX_y$ or $A_aX_bY_c$, wherein y is substantially equal to w+x, a is substantially equal to b+c, A is a group 2 metal or a group 1A alkali metal, B is a group 1A alkali metal, and X and Y are group 7A halogens. In one or more examples, A is selected from the group 2 metals consisting of Be, Mg, Ca, Sr, Ba, and Ra. In one or more examples, A and/or B are selected from the group 1A alkali metals consisting of Li, Na, K, Rb, Cs, and Fr. In one or more examples, X and Y are selected from the group 7A halogens consisting of F, Cl, Br, I and At.

In one or more examples, the ternary halides comprising the compound of formula $A_wB_xX_y$ include $K_4NaCl_5$, $K_2NaCl_3$, $KNaCl_2$, $KNa_4Cl_5$, or a combination thereof. In one or more examples, the ternary halides comprising the compound of formula $A_aX_bY_c$ include $BaIBr$, $K_5BrCl_4$, $K_5Br_4Cl$, $K_3BrCl_2$, $K_2BrCl$, $K_3I_2Br$, $Li_2IBr$, $Na_5Br_4Cl$, $Na_2BrCl$, $Na_3BrCl_2$, $Na_5BrCl_4$, or a combination thereof.

The ternary halides can comprise a caswellsilverite-like structure, such as an $NaHF_2$-type hexagonal rhombohedral structure (R3m).

The ternary sulfides can include materials comprising a compound of formula $AA_2BBS_4$ or $AABBS_3$, wherein S is sulfur, AA is a group 2 metal, and BB is a group 4 transition metal. In one or more examples, AA is selected from the group 2 metals consisting of Be, Mg, Ca, Sr, Ba, and Ra. In one or more examples, BB is selected from the group 4 transition metals consisting of Ti, Zr, Hf, or Rf. In one or more examples, the ternary sulfides can include $SrHfS_3$ or $SrZrS_3$, or a combination thereof. A compound of formula $AA_2BBS_4$ can crystallize into monoclinic $P2_{1/m}$ space group. A compound of formula $AABBS_3$ can crystallize into an orthorhombic crystal system having a space group Pnma.

In one or more examples, the pool of candidate materials screened according to step 110 can include additional materials that are not grouped into one of the four material families above, but are chemically stable with Li metal. Such materials can include $Li_2S$, $BaI_2$, $KBa_2I_5$, $Sr_3CaS_4$, $Sr_2SiS_4$, $Ba_2SiS_4$, or a combination thereof.

Battery Cells, Battery Modules, Battery Packs, and Electric Vehicle Systems

One or more interfacial materials, as identified via method 100 of FIG. 1, can be incorporated into a battery cell, which can be used as an electrical energy source. When incorporated into a battery cell, the interfacial material can improve the stability of the battery cell. Such interfacial materials may be implemented in a battery cell in a number of ways, for example, as a coating on a sheet-like material and/or a particulate material. A coating comprising an interfacial material may range from 1 nanometer (nm) to several micrometers (μm) in thickness. In one or more examples, a coating comprising an interfacial material may be less than 0.5 micrometers thick.

Figure 3A:
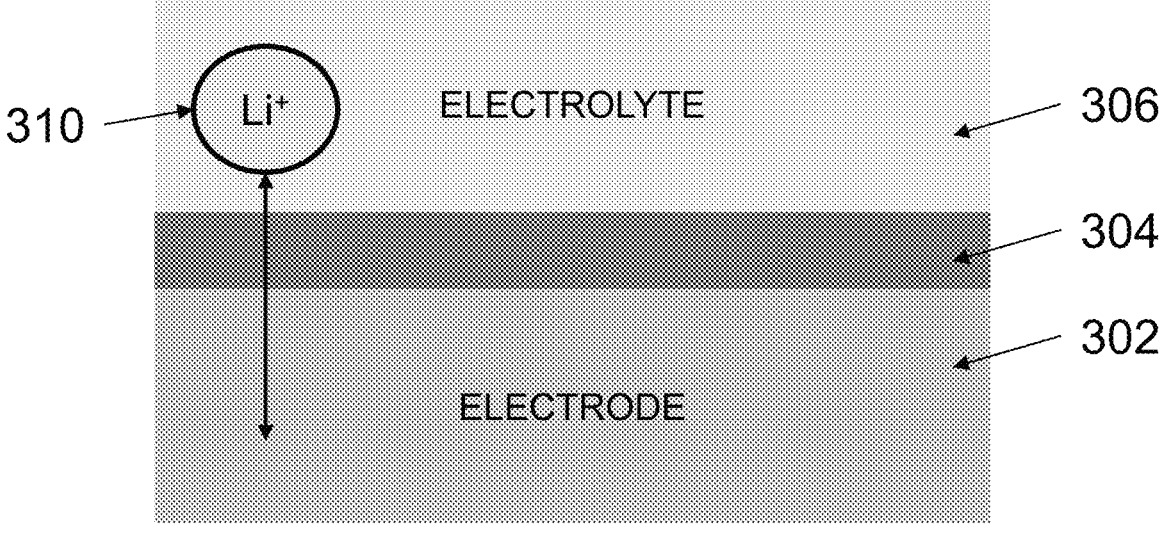
FIG. 3A illustrates a layered interfacial coating, in accordance with some embodiments disclosed herein.

FIG. 3A illustrates a layered interfacial coating arrangement in accordance with some embodiments disclosed herein. The interfacial material 304 is disposed at the interface between an electrode 302 and an electrolyte 306. Lithium ions 310 may be transported between the electrode 302 and the electrolyte 306. The interfacial material 304 may be a standalone layer that is inserted between the electrolyte 306 and the electrode 302, or it may be formed as a coating on the electrode 302 (and/or the electrolyte 306 in the case of a solid-state electrolyte) prior to electrochemical construction. When the interfacial material is incorporated as a coating, the interfacial material may be deposited on the electrode 302 and/or the electrolyte 306 using any suitable deposition technique such as chemical vapor deposition (CVD), physical vapor deposition (PVD), pulsed laser deposition (PLD), emulsion, solgel, atomic layer deposition (ALD), etc. In one or more examples, the interfacial material 304 may have an ionic conductivity that is greater than $10^{-4}$ S/cm or greater than $10^{-3}$ S/cm.

Figure 3B:
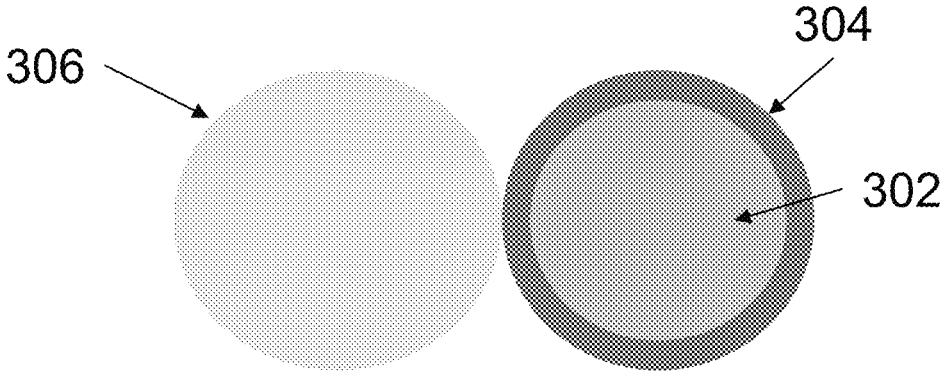
FIG. 3B illustrates a particulate interfacial coating, in accordance with some embodiments disclosed herein.

FIG. 3B illustrates a particulate interfacial coating arrangement, in accordance with some embodiments disclosed herein. As shown in FIG. 3B, the interfacial material 304 coats the electrode 302, which is a particulate material. The interfacial material 304 may be deposited on a particulate material using any suitable deposition technique. For example, anhydrous powders can be dissolved in deionized water or anhydrous ethanol to form aqueous or ethanol solutions that form layers or "films" of material. Particular interfacial materials can be created by controlling the ratio of the anhydrous powder components. The well-dissolved aqueous or ethanol solution can then be evenly sprayed onto the particulate material being coated. For instance, the solution may be sprayed onto cathode powders. After spraying, the wetted particulate can be pressed under an axial pressure sufficient to form pellets, such as around 10 MPa. The pellets may be placed in a vacuum oven and heated to evaporate the solvent (aqueous or ethanol). For example, pellets having about a 1 mm thickness may be heated in a vacuum oven at 160° C. for twelve hours. After heating, the pellets comprise an outer coating as depicted in FIG. 3B.

The interfacial material 304 may coat any type of material in a battery cell. For instance, the interfacial material 304 may coat a particulate comprising one or more of a cathode material, an anode material, a conductive additive material, a binder material, and an electrolyte material. Similarly, the interfacial material 304 may coat such materials (e.g., the cathode material, anode material, conductive additive material, binder material, and/or electrolyte material) that are not in particulate form, such as when they are formed as a sheet-like layer.

When the interfacial material 304 coats one or both of the electrodes of a battery (e.g., the cathode and/or anode), the interfacial material 304 insulates the electrode 302 from the electrolyte 306. In a solid-state battery, the interfacial material 304 can improve the stability of the battery by improving the stability at the interface(s) of the battery. For instance, if the interfacial material 304 coats the anode electrode of the battery, the interfacial material can allow lithium ions to travel between the anode and electrolyte while preventing or reducing a chemical reaction between the electrolyte material and the anode electrode material, and thereby improve the stability of the battery cell.

Reference will now be made to implementations and embodiments of various aspects and variations of battery cells, battery modules, battery packs, and the methods of making such battery cells, battery modules, and battery packs. Although several exemplary variations of the battery cells, modules, packs, and methods of making them are described herein, other variations of the battery cells, modules, packs and methods may include aspects of the battery cells, modules, packs and methods described herein combined in any suitable manner having combinations of all or some of the aspects described. In addition, any part of or any of the electrodes, densified electrodes, components, systems, methods, apparatuses, devices, compositions, interfacial materials described herein can be implemented into the battery cells, battery modules, battery packs, and methods of making these battery cells, battery modules, and battery packs.

Figure 4:
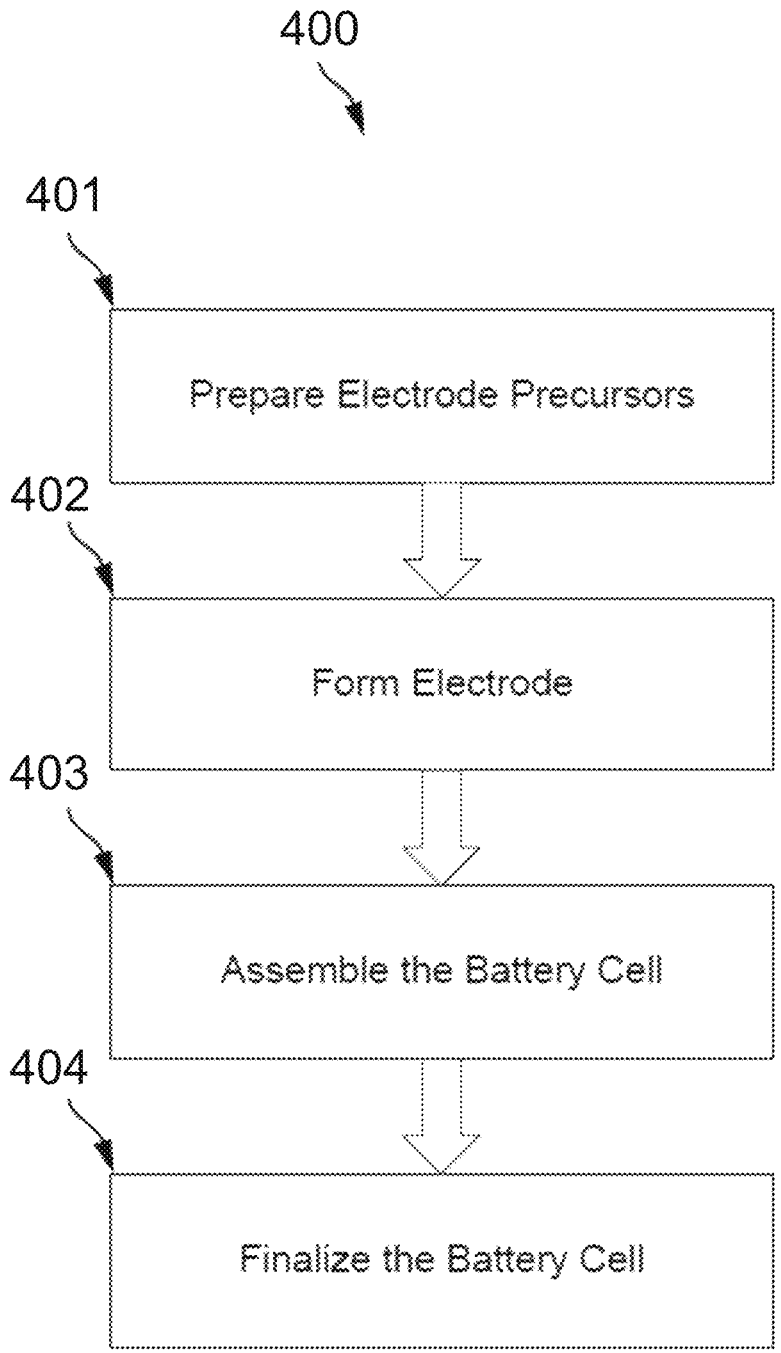
FIG. 4 illustrates a flow chart for a typical battery cell manufacturing process in accordance with some embodiments disclosed herein.

FIG. 4 illustrates a flow chart for a typical battery cell manufacturing process 400. These steps are not exhaustive and other battery cell manufacturing processes can include additional steps or only a subset of these steps. At step 401, the electrode precursors (e.g., binder, active material, conductive carbon additive) can be prepared. In some embodiments, this step can include mixing electrode materials (e.g., active materials) with additional components (e.g., binders, solvents, conductive additives, etc.) to form an electrode slurry. In some embodiment, this step can include synthesizing the electrode materials themselves.

At step 402, the electrode can be formed. In some embodiments, this step can include coating an electrode slurry on a current collector. In some embodiments, the electrode or electrode layer can include electrode active materials, conductive carbon material, binders, and/or other additives.

In some embodiments, the electrode active materials can include cathode active materials. In some embodiments, the cathode active materials can include olivine or phosphate-based cathode active materials. In some embodiments, the cathode active materials can include over-lithiated-oxide material (OLO), nickel-based cathode materials (e.g., nickel manganese cobalt (NMC) such as NMC111, NMC523, NMC622, NMC811, NMCA, nickel cobalt aluminum oxide (NCA), and Ni90+). In some embodiments, the cathode active materials can include high-nickel content (greater than or equal to about 80% Ni) lithium transition metal oxide. Such lithium transition metal oxides can include a particulate lithium nickel manganese cobalt oxide ("LiNMC"), lithium nickel cobalt aluminum oxide ("LiNCA"), lithium nickel manganese cobalt aluminum oxide ("LiNMCA"), lithium nickel manganese cobalt oxide ("LiNMC), lithium cobalt oxide (LCO), lithium manganese oxide (LMO), lithium metal phosphates like lithium iron phosphate ("LFP"), lithium iron manganese phosphate ("LMFP"), sulfur containing cathode materials, lithium sulfide ($Li_2S$), a metal oxide material (e.g., manganese oxide (MO)), lithium polysulfides, titanium disulfide ($TiS_2$), and combinations thereof.

In some embodiments, the electrode active materials can include anode active materials. In some embodiments, the anode active materials can include graphitic carbon (e.g., ordered or disordered carbon with sp2 hybridization, artificial or natural Graphite, or blended), Li metal anode, silicon-based anode (e.g., silicon-based carbon composite anode, silicon metal, oxide, carbide, pre-lithiated), silicon-based carbon composite anode, lithium alloys (e.g., Li—Mg, Li—Al, Li—Ag alloy), lithium titanate, or combinations thereof. In some embodiments, an anode material can be formed within a current collector material. For example, an electrode can include a current collector (e.g., a copper foil) with an in situ-formed anode (e.g., Li metal) on a surface of the current collector facing the separator or solid-state electrolyte. In such examples, the assembled cell may not comprise an anode active material in an uncharged state.

In some embodiments, the conductive carbon material can include graphite, carbon black, carbon nanotubes, Super P carbon black material, Ketjen Black, Acetylene Black, SWCNT, MWCNT, carbon nanofiber, graphene, and combinations thereof.

In some embodiments, the binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE"), carboxymethylcellulose ("CMC"), agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(methyl acrylate) (PMA), poly(vinyl alcohol) (PVA), poly(vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or combinations thereof.

After coating, the coated current collector can be dried to evaporate any solvent. In some embodiments, this step can include calendaring the coated current collectors. Calendaring can adjust the physical properties (e.g., bonding, conductivity, density, porosity, etc.) of the electrodes. In some embodiments, the electrode can then be sized via a slitting and/or notching machine to cut the electrode into the proper size and/or shape.

In some embodiments, the electrolyte material can include a solid electrolyte material that can conduct ions. For example, the solid electrolyte layer can conduct ions without receiving a separate liquid electrolyte material. In some embodiments, solid electrolyte materials of the solid electrolyte layer can include inorganic solid electrolyte materials such as oxides, sulfides (e.g., crystalline $\beta$-Li$_3$PS$_4$, amorphous $\beta$-Li$_3$PS$_4$, $\alpha$-(100-x)Li$_7$·xP$_3$S$_{11}$, $\beta$-(100-x) Li$_7$·xP$_3$S$_{11}$, $\gamma$-(100-x)Li$_7$·xP$_3$S$_{11}$, Li$_2$S—P$_2$S$_5$, Li$_6$PS$_5$Cl, Li$_6$PS$_5$Br, Li$_6$PS$_5$I, etc.), phosphides, halides, ceramics, solid polymer electrolyte materials, hybrid solid state electrolytes, or glassy electrolyte materials, among others, or in any combinations thereof. In some embodiments, the solid electrolyte layer can include a polyanionic or oxide-based electrolyte material (e.g., Lithium Superionic Conductors (LISICONs), Sodium Superionic Conductors (NASICONs), perovskites with formula ABO$_3$ (A=Li, Ca, Sr, La, and B=Al, Ti), garnet-type with formula A$_3$B$_2$(XO$_4$)$_3$ (A=Ca, Sr, Ba and X=Nb, Ta), lithium phosphorous oxy-nitride (LixPOyNz), among others, or in any combinations thereof. In some embodiments, the solid electrolyte layer can include a glassy, ceramic and/or crystalline electrolyte material such as Li$_3$PS$_4$, Li$_2$P$_3$S$_{11}$, Li$_2$S—P$_2$S$_5$, Li$_2$S—B$_2$S$_3$, SnS—P$_2$S$_5$, Li$_2$S—SiS$_2$, Li$_2$S—P$_2$S$_5$, Li$_2$S—GeS$_2$, lithium phosphorous oxy-nitride (Li$_x$PO$_y$N$_z$), lithium germanium phosphate sulfur (Li$_{10}$GeP$_2$S$_{12}$), Yttria-stabilized Zirconia (YSZ), NASICON (Na$_3$Zr$_2$Si$_2$PO$_{12}$), beta-alumina solid electrolyte (BASE), perovskite ceramics (e.g., strontium titanate (SrTiO$_3$)), Lithium lanthanum zirconium oxide (La$_3$Li$_7$O$_{12}$Zr$_2$), LiSiCON (Li2+2xZn1–xGeO4), lithium lanthanum titanate (Li3xLa2/3–xTiO3) and/or sulfide-based lithium argyrodites with formula Li$_6$PS$_5$X (X=Cl, Br) like Li$_6$PS$_5$Cl, among others, or in any combinations thereof. Furthermore, solid state polymer electrolyte materials can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), and PEG, among others, or in any combinations thereof. In some embodiments, the solid electrolyte layer can include thio-LISICON Li$_{11-x}$M$_{2-x}$P$_{1+x}$S$_{12}$ (e.g., M=Ge, Sn, or Si), TLi$_2$S—P$_2$S$_5$—LiI, Li$_4$P$_2$S$_7$—LiI, Li$_2$S-M (e.g., M=SiS$_2$, GeS$_2$, P$_2$S$_5$, B$_2$S$_3$, As$_2$S$_3$), xLi$_2$S$_{(1-x)}$SiS$_2$ (e.g, x≤0.6), SiS$_2$—P$_2$S$_5$—Li$_2$S—LiI, Li$_7$P$_2$S$_8$I, Li$_{3.25}$Si$_{0.25}$P$_{0.75}$S$_4$, Li$_7$P$_2$S$_8$I, Li$_{15}$(PS$_4$)$_4$Cl$_3$, Li$_{14.8}$Mg$_{0.1}$ (PS$_4$)$_4$Cl$_3$, Li$_{10}$SiP$_2$S$_{11.3}$O$_{0.7}$, Li$_{9.4}$Si$_{11.02}$P$_{2.1}$S$_{9.96}$O$_{2.04}$, Li$_{9.54}$Si$_{1.74}$P$_{1.44}$S$_{11.7}$Cl$_{0.3}$, Li$_{11}$AlP$_2$S$_{12}$, 30Li$_2$S—25B$_2$S$_3$-45LiI-xSiO$_2$, or Li$_{1.05}$B$_{0.5}$Si$_x$O$_{2x}$S$_{1.05}$I$_{0.45}$ (0≤x≤1).

After forming the electrodes, one or more interfacial materials can be incorporated as a coating that is disposed on the surface of the electrodes. As discussed above, interfacial materials may be deposited on an electrode after the electrode has been formed, and/or may be deposited on an additive material such as a conductive additive or a binder material. The interfacial material may be added to a solid electrolyte material at one or both of the interfaces between the solid electrolyte and the electrodes. When incorporating an interfacial material in multiple locations within a battery cell, the battery cell may include interfacial materials having the same properties (e.g., the same compound) or having different properties. For example, a battery may include a first interfacial material at the interface between the cathode and the electrolyte layer and a second interfacial material at the interface between the anode and the electrolyte layer that is different from the first interfacial material.

At step 403, the battery cell can be assembled. After the electrodes, separators, interfacial material(s) and/or electrolytes have been prepared, a battery cell can be assembled/prepared. In this step, the separator and/or an electrolyte layer can be assembled between the anode and cathode layers to form the internal structure of a battery cell. In some embodiments, the electrolyte material can be disposed in the battery cell to separate an anode and a cathode from each other and to facilitate transfer of lithium ions between the anode and cathode. In some embodiments, the electrolyte layer can transfer cations (e.g., Li+ cations) from an anode to a cathode during discharge of the battery cell and can transfer ions from a cathode to an anode during charging of the battery cell. In some embodiments, the electrolyte material can support electrochemical reactions to store or provide electric power for the battery cell by allowing for the conduction of ions between a cathode and an anode. The various layers (electrodes, separators, coatings, and/or electrolytes) of a battery cell can be assembled by a winding method such as a round winding or prismatic/flat winding, a stacking method, or a z-folding method.

The assembled cell structure can then be inserted into a cell housing which is then partially or completed sealed. In addition, the assembled structure can be connected to terminals and/or cell tabs (via a welding process).

Battery cells can have a variety of form factors, shapes, or sizes. For example, battery cells (and their housings/casings) can have a cylindrical, rectangular, square, cubic, flat, or prismatic form factor, among others. There are four main types of battery cells: (1) button or coin cells; (2) cylindrical cells; (3) prismatic cells; and (4) pouch cells. Battery cells can be assembled, for example, by inserting a winding and/or stacked electrode roll (e.g., a jellyroll) into a battery cell casing or housing. In some embodiments, the winded or stacked electrode roll can include the electrolyte material. In some embodiments, the electrolyte material can be inserted in the battery casing or housing separate from the electrode roll. For battery cells utilizing a liquid electrolyte, the housed cell with the electrode structure inside it can also be filled with electrolyte and subsequently sealed. In some embodiments, the electrolyte material includes, but is not limited to, an ionically conductive fluid or other material (e.g., a layer) that can allow the flow of electrical charge (i.e., ion transportation) between the cathode and anode. In some embodiments, the electrolyte material can include a non-aqueous polar solvent (e.g., a carbonate such as ethylene carbonate, propylene carbonate, diethyl carbonate, ethyl methyl carbonate, dimethyl carbonate, or a mixture of any two or more thereof). The electrolytes may also include other additives such as, but not limited to, vinylidene carbonate, fluoroethylene carbonate, ethyl propionate, methyl propionate, methyl acetate, ethyl acetate, or a mixture of any two or more thereof. The lithium salt of the electrolyte may be any of those used in lithium battery construction including, but not limited to, lithium perchlorate, lithium hexafluorophosphate, lithium bis(fluorosulfonyl)imide, lithium bis(trifluorosulfonyl)imide, or a mixture of any two or more thereof. In addition, the salt may be present in the electrolyte from greater than 0 M to about 5 M, or for example salt may be present between about 0.05 to 2 M or about 0.1 to 2 M.

Figure 5:
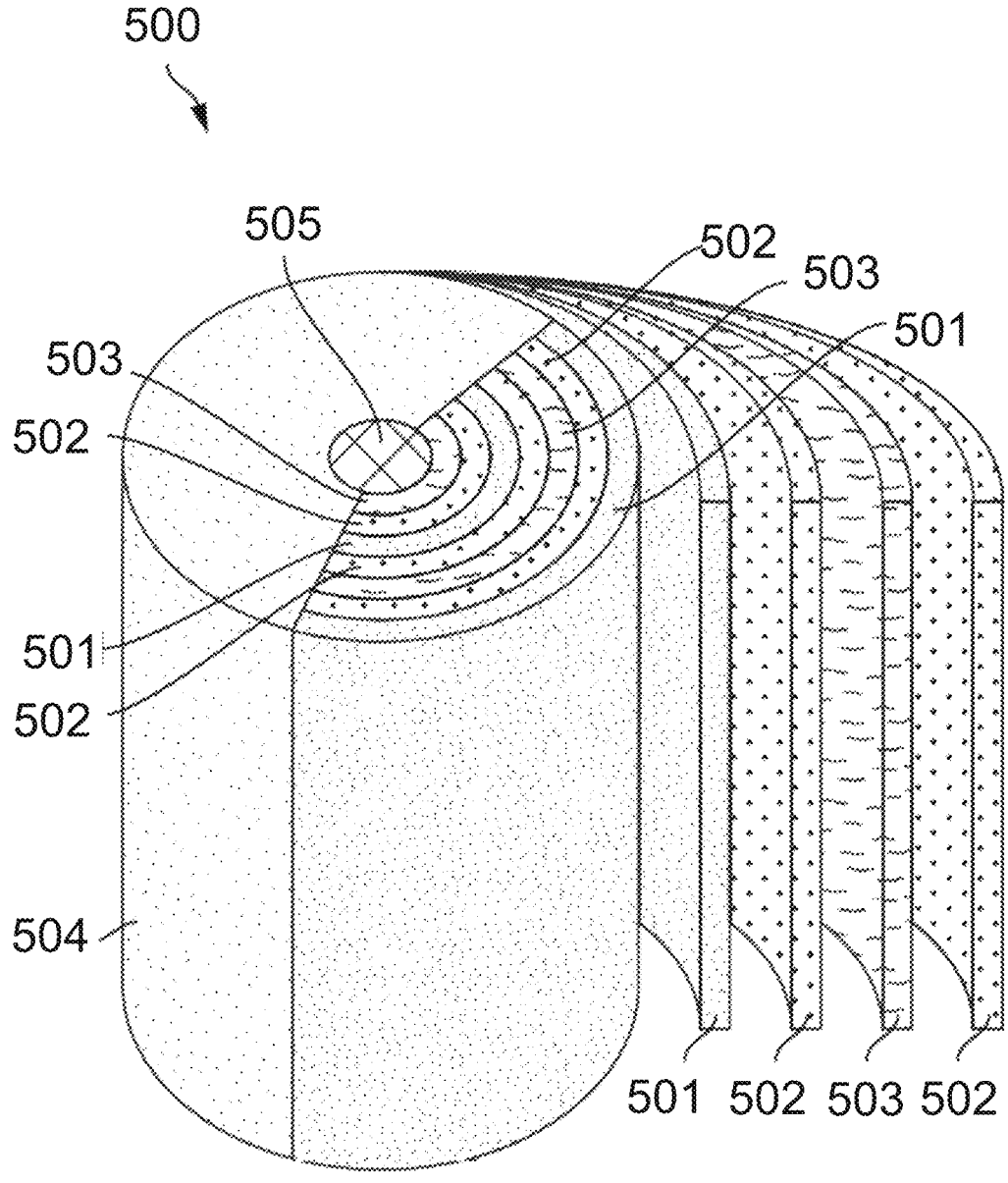
FIG. 5 depicts an illustrative example of a cross sectional view of a cylindrical battery cell in accordance with some embodiments disclosed herein.

FIG. 5 depicts an illustrative example of a cross sectional view of a cylindrical battery cell 500. The cylindrical battery cell can include layers (e.g., sheet-like layers) of anode layers 501, separator and/or electrolyte layers 502, and cathode layers 503. One or more of the anode layers 501, separator and/or electrolyte layers 502, and the cathode layers 503 can include a coating comprising an interfacial material as discussed above. Alternatively, the battery cell

500 can include a separate standalone interfacial material layer between one or more of these components (not shown in figure).

A battery cell can include at least one anode layer, which can be disposed within the cavity of the housing/casing. The battery cell can also include at least one cathode layer. The at least one cathode layer can also be disposed within the housing/casing. In some embodiments, when the battery cell is discharging (i.e., providing electric current), the at least one anode layer releases ions (e.g., lithium ions) to the at least one cathode layer generating a flow of electrons from one side to the other. Conversely, in some embodiments, when the battery cell is charging, the at least one cathode layer can release ions and the at least one anode layer can receive these ions. The battery cell can include at least one interfacial material (as a layer or a coating) that is ionically conductive to allow ions to travel between the cathode layer and anode layer, but prevents degradation by chemical reaction between components of the battery cell (e.g., that reduces or prevents a chemical reaction between the cathode layer and the electrolyte layer).

These layers (cathode, anode, separator/electrolyte layers) can be sandwiched, rolled up, and/or packed into a cavity of a cylinder-shaped casing 504 (e.g., a metal can). The casings/housings can be rigid such as those made from metallic or hard-plastic, for example. In some embodiments, a separator layer (and/or electrolyte layer) 502 can be arranged between an anode layer 501 and a cathode layer 503 to separate the anode layer 501 and the cathode layer 503. In some embodiments, the layers in the battery cell can alternate such that a separator layer (and/or electrolyte layer) separates an anode layer from a cathode layer. In other words, the layers of the battery electrode can be (in order) separator layer, anode/cathode layer, separator layer, opposite of other anode/cathode layer and so on. The separator layer (and/or electrolyte layer) 502 can prevent contact between the anode and cathode layers while facilitating ion (e.g., lithium ions) transport in the cell. The battery cell can also include at least one terminal 505. The at least one terminal can be electrical contacts used to connect a load or charger to a battery cell. In some embodiments, electrical connections with at least some of the electrolyte material can be formed at the at least one terminal. For example, the terminal can be made of an electrically conductive material to carry electrical current from the battery cell to an electrical load, such as a component or system of an electric vehicle as discussed further herein.

Figure 6:
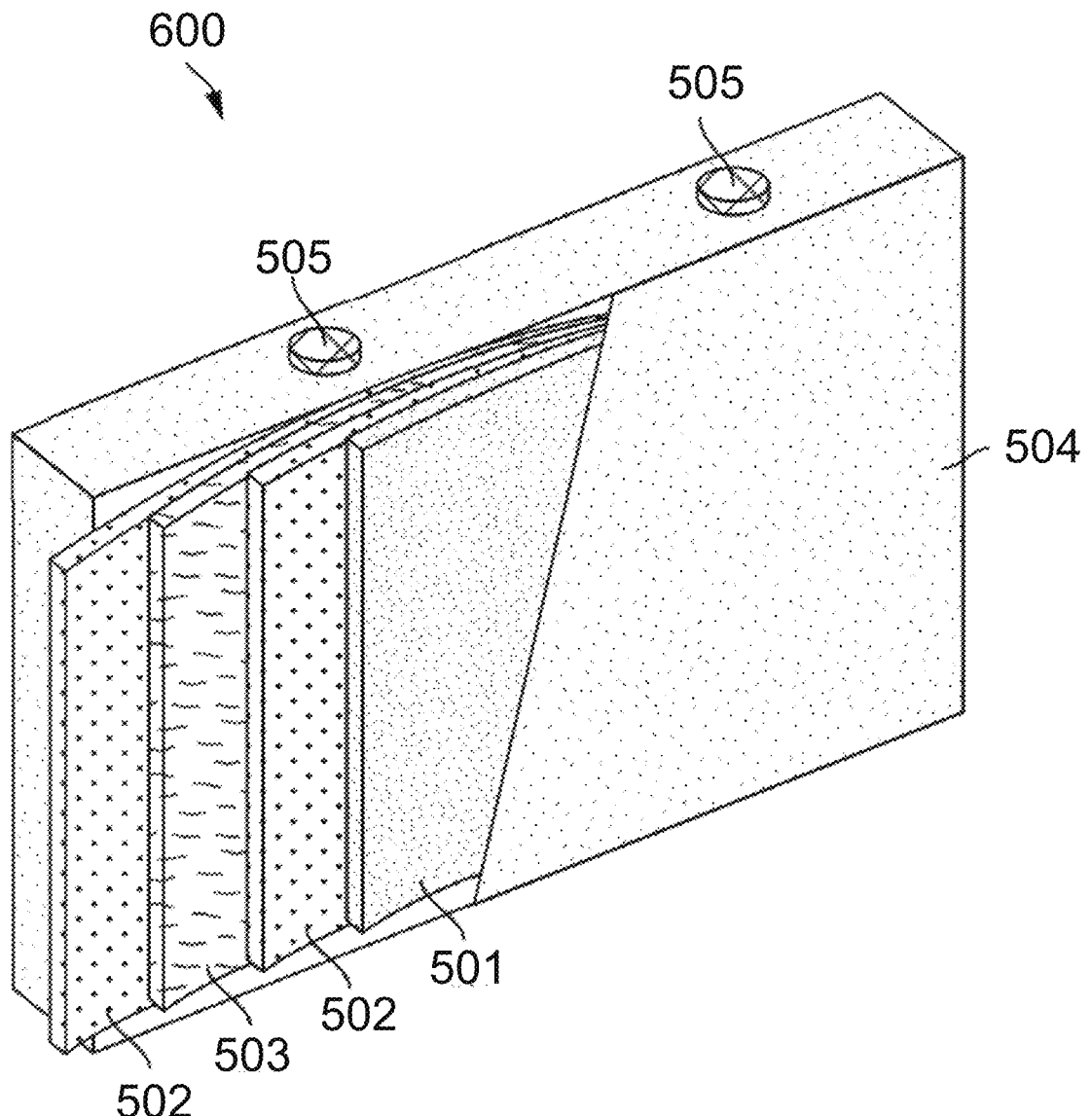
FIG. 6 depicts an illustrative example of a cross sectional view of a prismatic battery cell in accordance with some embodiments disclosed herein.

FIG. 6 depicts an illustrative example of a cross sectional view of a prismatic battery cell 600. The prismatic battery cell can include layers (e.g., sheet-like layers) of anode layers 501, separator and/or electrolyte layers 502, and cathode layers 503. As above, the prismatic battery cell can include a coating comprising an interfacial material on one or more of the anode layers 501, separator and/or electrolyte layers 502, and the cathode layers 503, or a separate standalone interfacial material layer between one or more of these components. Similar to the cylindrical battery cell, the layers of a prismatic battery cell can be sandwiched, rolled, and/or pressed to fit into cubic or rectangular cuboid (e.g., hyperrectangle) shaped casing/housing 504. In some embodiments, the layers can be assembled by layer stacking rather than jelly rolling. In some embodiments, the casing or housing can be rigid such as those made from a metal and/or hard-plastic. In some embodiments, the prismatic battery cell 600 can include more than one terminal 505. In some embodiments, one of these terminals can be the positive terminal and the other a negative terminal. These terminals can be used to connect a load or charger to the battery cell.

Figure 7:
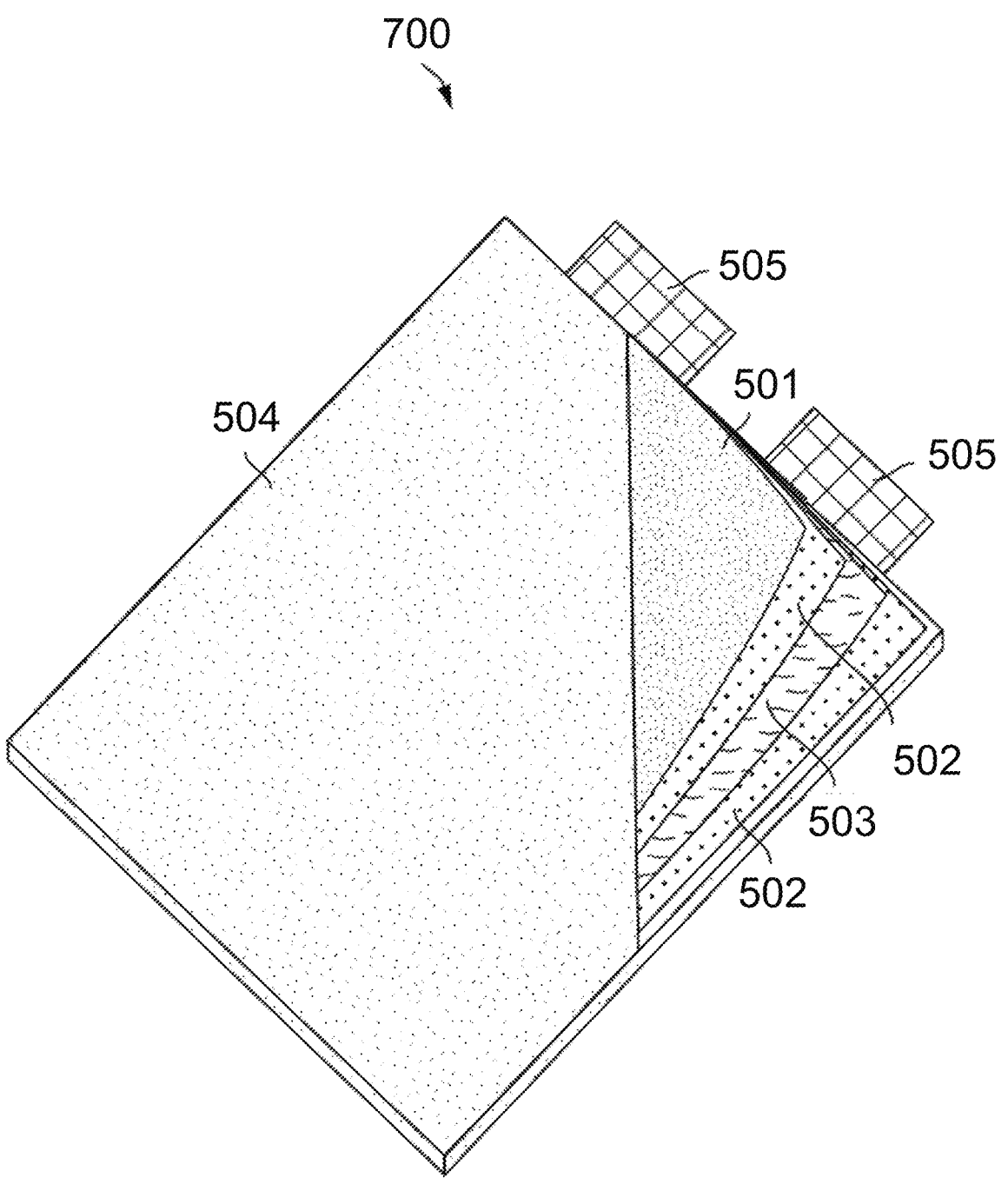
FIG. 7 depicts an illustrative example of a cross section view of a pouch battery cell in accordance with some embodiments disclosed herein.

FIG. 7 depicts an illustrative example of a cross section view of a pouch battery cell 700. The pouch battery cells do not have a rigid enclosure and instead use a flexible material for the casing/housing 504. This flexible material can be, for example, a sealed flexible foil. The pouch battery cell can include layers (e.g., sheet-like layers) of anode layers 501, separator and/or electrolyte layers 502, and cathode layers 503. As above, the pouch battery cell can include a coating comprising an interfacial material on one or more of the anode layers 501, separator and/or electrolyte layers 502, and the cathode layers 503, or a separate standalone interfacial material layer between one or more of these components. In some embodiments, these layers are stacked in the casing/housing. In some embodiments, the pouch battery cell 700 can include more than one terminal 505. In some embodiments, one of these terminals can be the positive terminal and the other the negative terminal. These terminals can be used to connect a load or charger to the battery cell.

The casings/housings of battery cells can include one or more materials with various electrical conductivity or thermal conductivity, or a combination thereof. In some embodiments, the electrically conductive and thermally conductive material for the casing/housing of the battery cell can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. In some embodiments, the electrically conductive and thermally conductive material for the housing of the battery cell can include a ceramic material (e.g., silicon nitride, silicon carbide, titanium carbide, zirconium dioxide, beryllium oxide, and among others) and/or a thermoplastic material (e.g., polyethylene, polypropylene, polystyrene, polyvinyl chloride, or nylon), among others.

At step 404, the battery cell can be finalized. In some embodiments, this step includes the formation process wherein the first charging and discharging process for the battery cell takes place. In some embodiments, this initial charge and discharge can form a solid electrolyte interface between the electrolyte and the electrodes. In some embodiments, this step may cause some of the cells to produce gas which can be removed in a degassing process from the battery cell. In some embodiments, this step includes aging the battery cell. Aging can include monitoring cell characteristics and performance over a fixed period of time. In some embodiments, this step can also include testing the cells in an end-of-line (EOL) test rig. The EOL testing can include discharging the battery cells to the shipping state of charge, pulse testing, testing internal resistance measurements, testing OCV, testing for leakage, and/or optically inspecting the battery cells for deficiencies.

Figure 8:
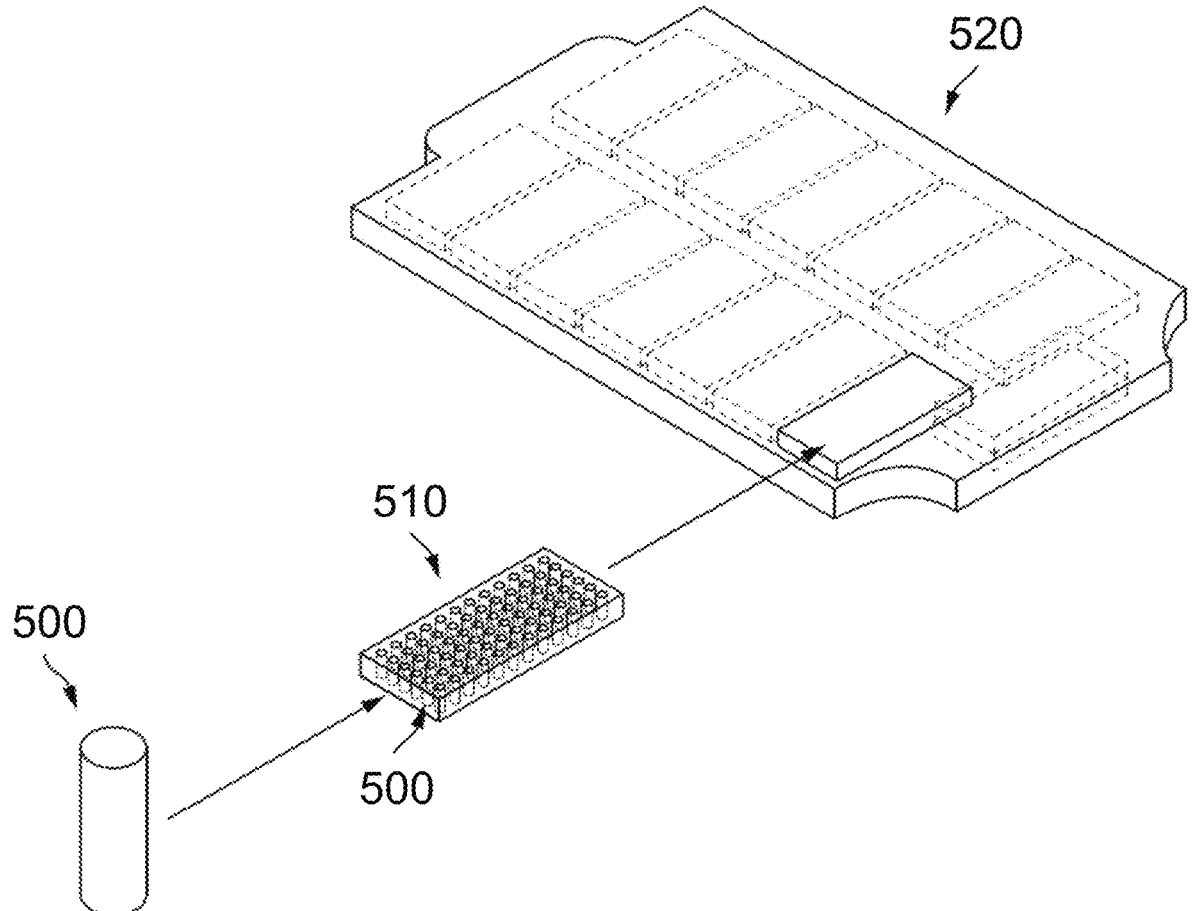
FIG. 8 illustrates cylindrical battery cells being inserted into a frame to form a battery module and pack in accordance with some embodiments disclosed herein.

A plurality of battery cells (500, 600, and/or 700) can be assembled or packaged together in the same housing, frame, or casing to form a battery module and/or battery pack. The battery cells of a battery module can be electrically connected to generate an amount of electrical energy. These multiple battery cells can be linked to the outside of the housing, frame, or casing, through a uniform boundary. The battery cells of the battery module can be in parallel, in series, or in a series-parallel combination of battery cells. The housing, frame, or casing can protect the battery cells from a variety of dangers (e.g., external elements, heat, vibration, etc.). FIG. 8 illustrates cylindrical battery cells 500 being inserted into a frame to form battery module 510.

Figure 9:
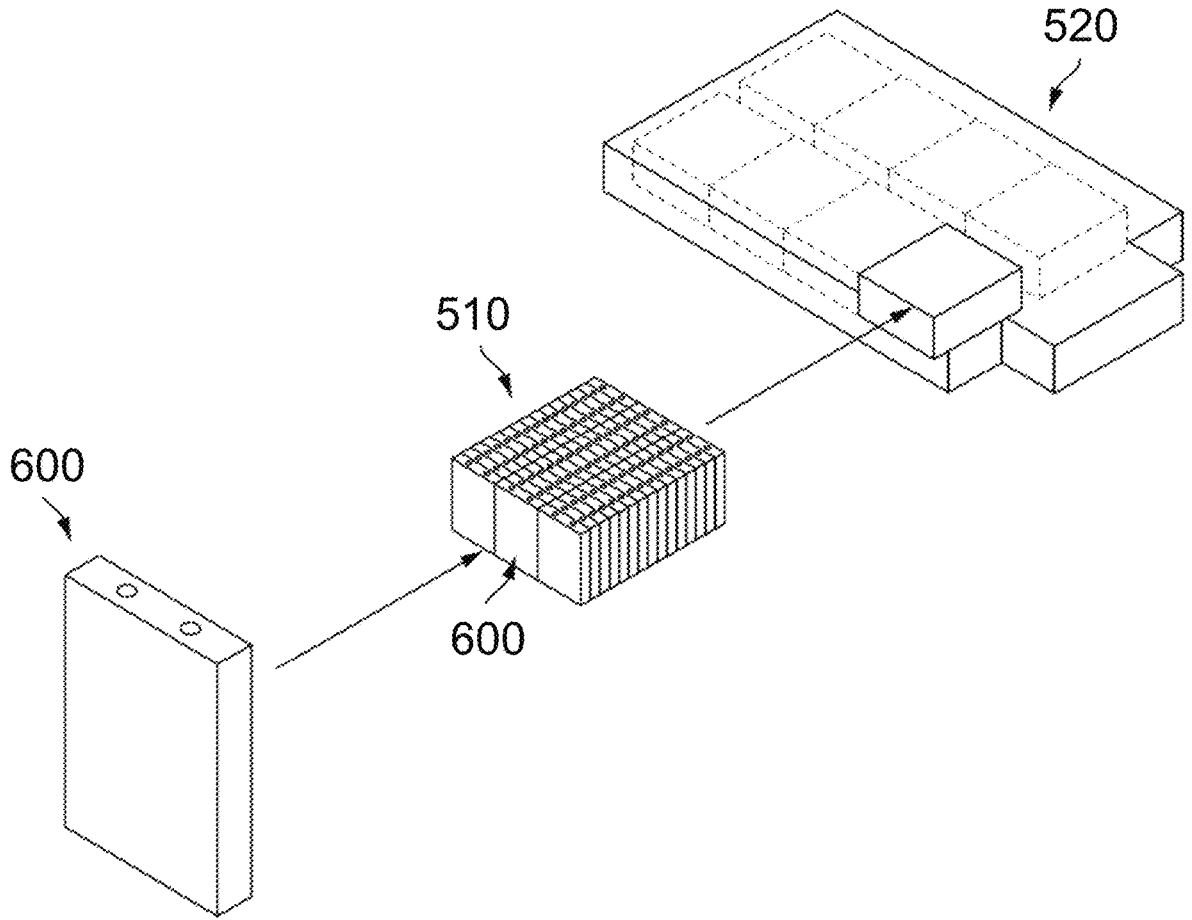
FIG. 9 illustrates prismatic battery cells being inserted into a frame to form a battery module and pack in accordance with some embodiments disclosed herein.
Figure 10:
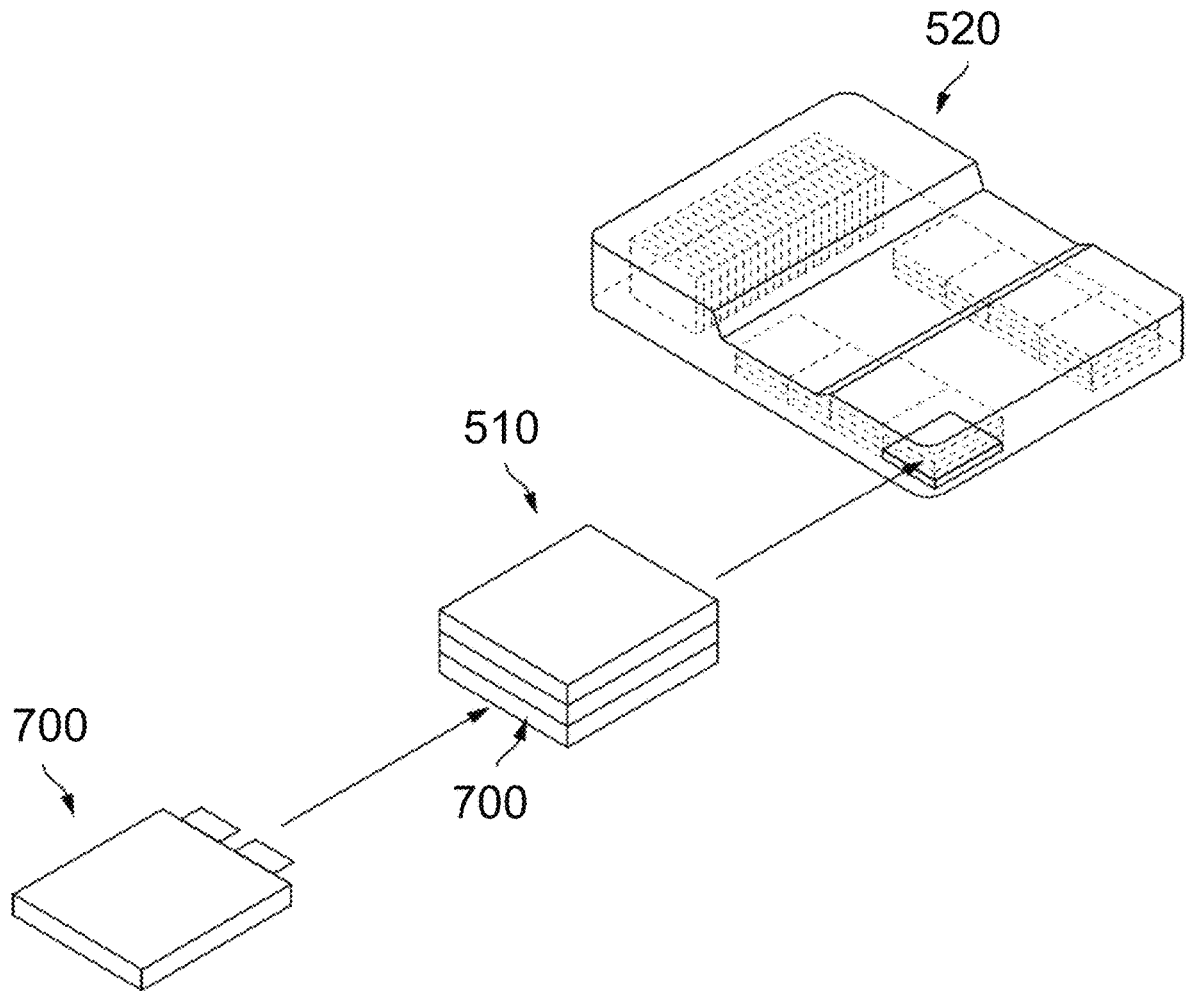
FIG. 10 illustrates pouch battery cells being inserted into a frame to form a battery module and pack in accordance with some embodiments disclosed herein.

FIG. 9 illustrates prismatic battery cells 600 being inserted into a frame to form battery module 510. FIG. 10 illustrates pouch battery cells 700 being inserted into a frame to form battery module 510. In some embodiments, the battery pack may not include modules. For example, the battery pack can have a "module-free" or cell-to-pack configuration wherein battery cells are arranged directly into a battery pack without assembly into a module.

A plurality of the battery modules 510 can be disposed within another housing, frame, or casing to form a battery pack 520 as shown in FIGS. 8-10. In some embodiments, a plurality of battery cells can be assembled, packed, or disposed within a housing, frame, or casing to form a battery pack (not shown). In such embodiments, the battery pack may not include a battery module (e.g., module-free). For example, the battery pack can have a module-free or cell-to-pack configuration where the battery cells can be arranged directly into a battery pack without assembly into a battery module. In some embodiments, the battery cells of the battery pack can be electrically connected to generate an amount of electrical energy to be provided to another system (e.g., an electric vehicle).

The battery modules of a battery pack can be electrically connected to generate an amount of electrical energy to be provided to another system (e.g., an electric vehicle). The battery pack can also include various control and/or protection systems such as a heat exchanger system (e.g., a cooling system) configured to regulate the temperature of the battery pack (and the individual modules and battery cells) and a battery management system configured to control the battery pack's voltage, for example. In some embodiments, a battery pack housing, frame, or casing can include a shield on the bottom or underneath the battery modules to protect the battery modules from external elements. In some embodiments, a battery pack can include at least one heat exchanger (e.g., a cooling line configured to distribute fluid through the battery pack or a cold plate as part of a thermal/temperature control or heat exchange).

In some embodiments, battery modules can collect current or electrical power from the individual battery cells that make up the battery modules and can provide the current or electrical power as output from the battery pack. The battery modules can include any number of battery cells and the battery pack can include any number of battery modules. For example, the battery pack can have one, two, three, four, five, six, seven, eight, nine, ten, eleven, twelve or other number of battery modules disposed in the housing/frame/casing. In some embodiments, a battery module can include multiple submodules. In some embodiments, these submodules may be separated by a heat exchanger configured to regulate or control the temperature of the individual battery module. For example, a battery module can include a top battery submodule and a bottom battery submodule. These submodules can be separated by a heat exchanger such as a cold plate in between the top and bottom battery submodules.

The battery packs can come in all shapes and sizes. For example, FIGS. 8-10 illustrates three differently shaped battery packs 520. As shown in FIGS. 8-10, the battery packs 520 can include or define a plurality of areas, slots, holders, containers, etc. for positioning of the battery modules. The battery modules can come in all shapes and sizes. For example, the battery modules can be square, rectangular, circular, triangular, symmetrical, or asymmetrical. In some examples, battery modules in a single battery pack may be shaped differently. Similarly, the battery module can include or define a plurality of areas, slots, holders, containers, etc. for the plurality of battery cells.

Figure 11:
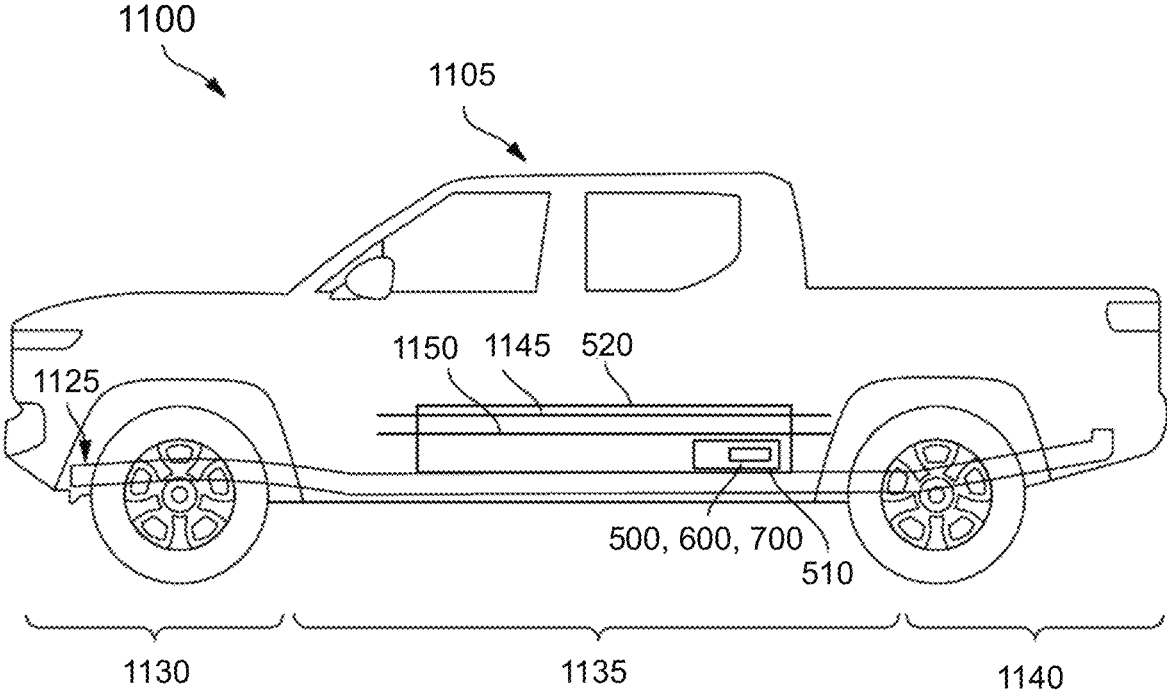
FIG. 11 illustrates an example of a cross sectional view of an electric vehicle that includes at least one battery pack in accordance with some embodiments disclosed herein.

FIG. 11 illustrates an example of a cross sectional view 1100 of an electric vehicle 1105 that includes at least one battery pack 520. Electric vehicles can include, but are not limited to, electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. Electric vehicles can be fully electric or partially electric (e.g., plug-in hybrid) and further, electric vehicles can be fully autonomous, partially autonomous, or unmanned. In addition, electric vehicles can also be human operated or non-autonomous.

Electric vehicles 1105 can be installed with a battery pack 520 that includes battery modules 510 with battery cells (500, 600, and/or 700) to power the electric vehicles. The electric vehicle 1105 can include a chassis 1125 (e.g., a frame, internal frame, or support structure). The chassis 1125 can support various components of the electric vehicle 1105. In some embodiments, the chassis 1125 can span a front portion 1130 (e.g., a hood or bonnet portion), a body portion 1135, and a rear portion 1140 (e.g., a trunk, payload, or boot portion) of the electric vehicle 1105. The battery pack 520 can be installed or placed within the electric vehicle 1105. For example, the battery pack 520 can be installed on the chassis 1125 of the electric vehicle 1105 within one or more of the front portion 1130, the body portion 1135, or the rear portion 1140. In some embodiments, the battery pack 520 can include or connect with at least one busbar, e.g., a current collector element. For example, the first busbar 1145 and the second busbar 1150 can include electrically conductive material to connect or otherwise electrically couple the battery pack 520 (and/or battery modules 510 or the battery cells 500, 600, and/or 700) with other electrical components of the electric vehicle 1105 to provide electrical power to various systems or components of the electric vehicle 1105. In some embodiments, battery pack 520 can also be used as an energy storage system to power a building, such as a residential home or commercial building instead of or in addition to an electric vehicle.

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

Reference to "about" a value or parameter herein includes (and describes) variations that are directed to that value or parameter per se. For example, description referring to "about X" includes description of "X". In addition, reference to phrases "less than", "greater than", "at most", "at least", "less than or equal to", "greater than or equal to", or other similar phrases followed by a string of values or parameters is meant to apply the phrase to each value or parameter in the string of values or parameters.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A battery comprising:
an anode;
a cathode;
a solid-state electrolyte layer; and
an interfacial material disposed at the interface of the anode and the solid state electrolyte layer;
wherein the interfacial material comprises a ternary sulfide of formula $AA_2BBS_4$ or $AABBS_3$, wherein:
S is Sulfur;
AA is a group 2 metal; and
BB is a group 4 transition metal.

2. The battery of claim 1, wherein the interfacial material comprises the ternary sulfide of formula $AA_2BBS_4$.

3. The battery of claim 1, wherein the interfacial material comprises the ternary sulfide of formula $AABBS_3$.

4. The battery of claim 1, wherein the interfacial material comprises $SrHfS_3$ or $SrZrS_3$.

5. The battery of claim 1, wherein the energy above the convex hull ($E_{hull}$) of the interfacial material is less than about 20 meV/atom.

6. The battery of claim 1,
wherein the interfacial material further comprises a compound of formula $A'_nX_m$, $A_wB_xX_y$, or $A_aX_bY_c$, wherein:
n is substantially equal to m;
y is substantially equal to w+x;
a is substantially equal to b+c;
A' is a group 1A alkali metal selected from Na, K, Rb, Cs, or Fr;
A is a group 1A alkali metal or a group 2 metal;
B is group 1A alkali metal; and
X and Y are group 7A halogens.

7. The battery of claim 6, wherein the interfacial material further comprises the compound of $A'_nX_m$ as a rock-salt structure.

8. The battery of claim 6, wherein the interfacial material further comprises NaI, NaBr, KI, KBr, KCl, or NaCl.

9. The battery of claim 6, wherein the interfacial material further comprises the ternary halide of formula $A_wB_xX_y$ or $A_aX_bY_c$.

10. The battery of claim 9, wherein the ternary halide comprises a caswellsilverite-like structure.

11. The battery of claim 6, wherein the interfacial material further comprises $K_5BrCl_4$, $K_5Br_4Cl$, $K_3I_2Br$ $K_3BrCl_2$, $K_2BrCl$, $Li_2IBr$, $Na_5Br_4Cl$, $K_2NaCl_3$, $Na_2BrCl$, $Na_3BrCl_2$, $Na_5BrCl_4$, BalBr, or a combination thereof.

12. The battery of claim 1, wherein the anode comprises a metallic sheet and the interfacial coating is disposed on the metallic sheet of the battery.

13. The battery of claim 1, wherein the anode comprises a particulate material and the interfacial coating is disposed on the particulate material of the anode.

14. The battery of claim 1, wherein the interfacial material comprises a standalone layer disposed between the anode and the solid-state electrolyte layer.

15. The battery of claim 1, wherein the interfacial coating comprises a layer that is disposed on the anode of the battery, a conductive additive material of the battery, a binder material of the battery, the solid-state electrolyte layer, or any combination thereof.

16. The battery of claim 1, wherein the anode comprises graphitic carbon, lithium, a lithium alloy, lithium titanate, silicon, a silicon-based carbon composite, or any combination thereof.

17. The battery of claim 1, wherein the solid-state electrolyte is argyrodite-based.

18. The battery of claim 1, wherein the solid-state electrolyte comprises LPSC, $Li_6PS_5Cl$, a doped composition of LPSC, a doped composition of $Li_6PS_5Cl$, an off-stoichiometric composition of LPSC, an off-stoichiometric composition of $Li_6PS_5Cl$, or any combination thereof.

* * * * *